United States Patent
Yoshikawa et al.

(10) Patent No.: US 11,720,816 B2
(45) Date of Patent: Aug. 8, 2023

(54) PREDICTING PIPE FAILURE

(71) Applicant: Fracta, Redwood City, CA (US)

(72) Inventors: Daichi Yoshikawa, Cupertino, CA (US); Takashi Kato, Menlo Park, CA (US)

(73) Assignee: Fracta, Los Altos, CA (US)

( * ) Notice: Subject to any disclaimer, the term of this patent is extended or adjusted under 35 U.S.C. 154(b) by 908 days.

(21) Appl. No.: 16/365,466

(22) Filed: Mar. 26, 2019

(65) Prior Publication Data
US 2019/0303791 A1    Oct. 3, 2019

Related U.S. Application Data

(60) Provisional application No. 62/743,483, filed on Oct. 9, 2018, provisional application No. 62/743,477, filed
(Continued)

(51) Int. Cl.
*G06N 20/00* (2019.01)
*G06F 17/18* (2006.01)
(Continued)

(52) U.S. Cl.
CPC .............. *G06N 20/00* (2019.01); *G01M 3/00* (2013.01); *G06F 17/18* (2013.01); *G06F 30/00* (2020.01);
(Continued)

(58) Field of Classification Search
CPC ........ G01M 3/00; G06F 16/787; G06F 17/18; G06F 2113/14; G06F 30/00; G06N 20/00;
(Continued)

(56) References Cited

U.S. PATENT DOCUMENTS

| 5,731,991 A | 3/1998 | Kinra |
| 6,556,924 B1 | 4/2003 | Kariyawasam |

(Continued)

FOREIGN PATENT DOCUMENTS

| CN | 201229289 | 4/2009 |
| CN | 104281921 | 1/2015 |

(Continued)

OTHER PUBLICATIONS

English machine translation of Liu et al. (CN 107480705 A) (Year: 2020).*

(Continued)

*Primary Examiner* — Roy Y Yi
*Assistant Examiner* — Geoffrey T Evans
(74) *Attorney, Agent, or Firm* — Wissing Miller LLP

(57) ABSTRACT

An improved solution accurately predicts of an underground pipe's likelihood of leaking. A data-driven approach uses a combination of information acquisition, classification, regression and/or machine learning. The replacement of underground pipes can be prioritized. Pipe data is inputted and processed. Potential features within the cleaned data is used in pipe life of failure prediction models. The importance of the potential features is ranked. The most important features are extracted and applied to a likelihood of failure model that is created based on historical data and machine learning. Future likelihood of failure for each pipe in the network of pipes can be predicted using the model.

23 Claims, 27 Drawing Sheets

Related U.S. Application Data on Oct. 9, 2018, provisional application No. 62/743,485, filed on Oct. 9, 2018, provisional application No. 62/671,601, filed on May 15, 2018, provisional application No. 62/658,189, filed on Apr. 16, 2018, provisional application No. 62/649,058, filed on Mar. 28, 2018.

(51) Int. Cl.

| | | |
|---|---|---|
| *G01M 3/00* | (2006.01) | |
| *G06Q 10/0631* | (2023.01) | |
| *G06N 7/01* | (2023.01) | |
| *G06F 113/14* | (2020.01) | |
| *G06F 30/00* | (2020.01) | |
| *G06N 20/20* | (2019.01) | |
| *G06Q 10/00* | (2023.01) | |
| *G06F 16/787* | (2019.01) | |
| *G06Q 10/087* | (2023.01) | |
| *G06Q 30/012* | (2023.01) | |

(52) U.S. Cl.
CPC ............. *G06N 7/01* (2023.01); *G06N 20/20* (2019.01); *G06Q 10/0631* (2013.01); *G06F 16/787* (2019.01); *G06F 2113/14* (2020.01); *G06Q 10/00* (2013.01); *G06Q 10/087* (2013.01); *G06Q 30/012* (2013.01)

(58) Field of Classification Search
CPC ........ G06N 20/20; G06N 5/003; G06N 7/005; G06Q 10/00; G06Q 10/0631; G06Q 10/087; G06Q 30/012
See application file for complete search history.

(56) References Cited

U.S. PATENT DOCUMENTS

| | | |
|---|---|---|
| 6,862,540 B1 | 3/2005 | Welch |
| 9,395,262 B1 | 7/2016 | Kumar |
| 2007/0083398 A1 | 4/2007 | Ivey |
| 2011/0137704 A1 | 6/2011 | Mitra |
| 2013/0138396 A1 | 5/2013 | Hauffen |
| 2013/0211797 A1* | 8/2013 | Scolnicov .............. G06Q 50/06 703/2 |
| 2014/0052421 A1 | 2/2014 | Allen |
| 2014/0110167 A1 | 4/2014 | Goebel |
| 2015/0248737 A1 | 9/2015 | Forbes |
| 2016/0103433 A1 | 4/2016 | Sahni |

FOREIGN PATENT DOCUMENTS

| | | | |
|---|---|---|---|
| CN | 105069694 | 11/2015 | |
| CN | 107480705 A | * 12/2017 | ........... G06K 9/6256 |

OTHER PUBLICATIONS

U.S. Department of Transportation "Work Zone Road User Costs" DOT; White Paper [online]. Dec. 2011 [retrieved Dec. 6, 2019]. Retrieved from the Internet: <URL: https://ops.fhwa.dot.gov/wz/resources/publications/fhwahop 12005/fhwahop 12005.pdf>.

Service Line Warranties of America "Average Cost of a Service Line Repair or Replacement" Blog [online]. Jun. 16, 2014 [retrieved Dec. 6, 2019]. Retrieved from the Internet: <URL: https://slwablog.com/2014/06/16/average-cost-of-a-service-line-repair-or-replacement/>.

Balkan, D "Calculating The Correct Water Supply Line Size for Your Home or Property" 1-20 Article [online]. Sep. 22, 2014 [retrieved Dec. 6, 2019]. Retrieved from the Internet: <URL: http://www.balkanplumbing.com/required-main-water-supply-line-size/>.

* cited by examiner

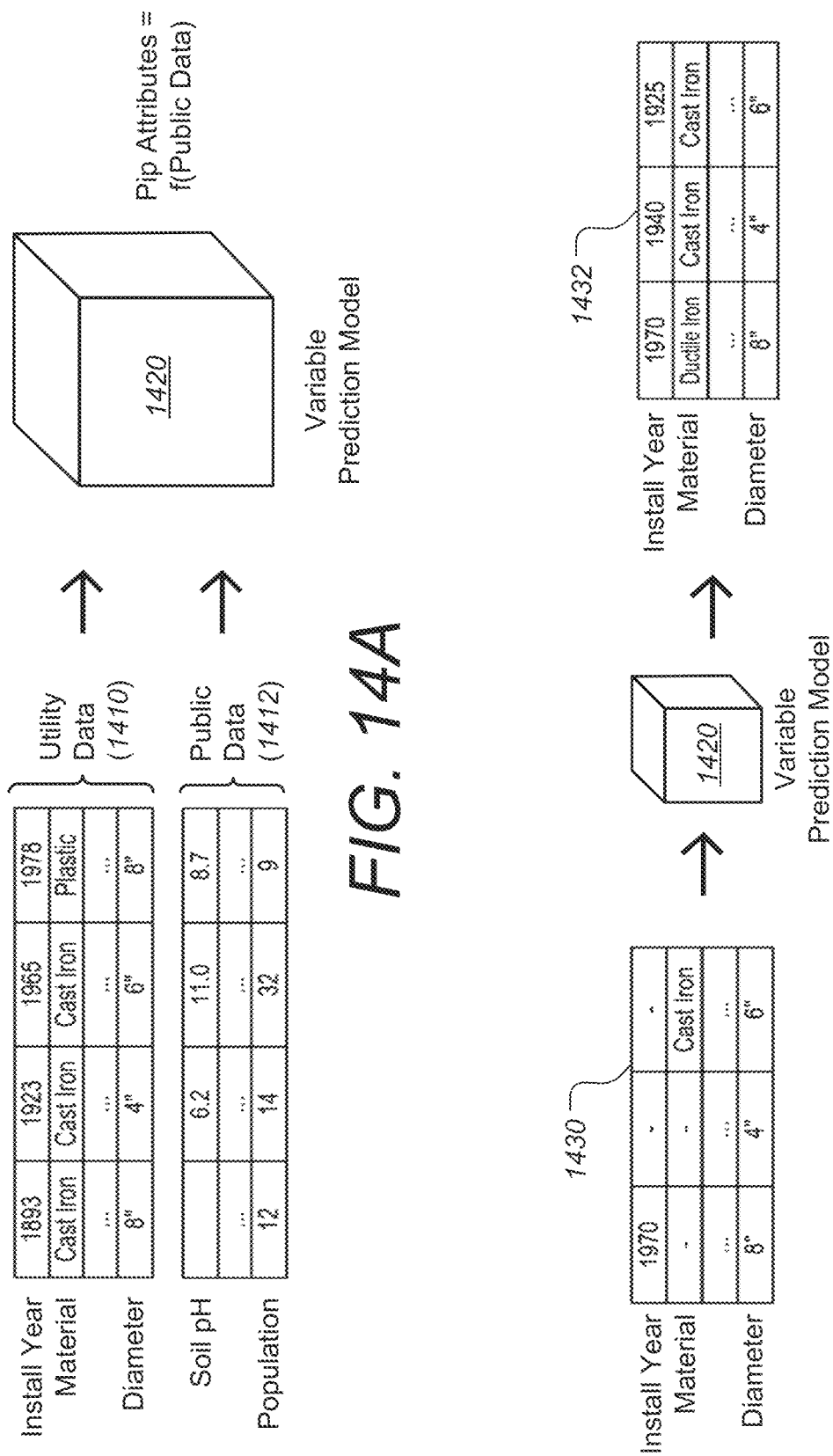

1712 → ACME Cleaned Pipe Data

| Material | Installation Year | Diameter | ... |
|---|---|---|---|
| CI | 1943 | 6 | ... |
| CI | 1945 | 6 | ... |
| ST | 2011 | 14 | ... |
| CI | 1923 | 8 | ... |
| DI | 1980 | 4 | ... |
| AC | 1956 | 8 | ... |

↑ Data Cleaning

1710 → ACME Raw Pipe Data

| Material | Installation Year | Diameter | ... |
|---|---|---|---|
| CIP | 1943 | 6 | ... |
| Cast Iron |  | 6 | ... |
| ST | 2011 | 8 | ... |
|  | 1923 | 4 | ... |
|  | 1980 |  | ... |
| Asbestos |  | 8 | ... |

FIG. 17

| Soil | Terrain | Diameter | ... | Material |
|---|---|---|---|---|
| 0 | -0.53 | 0.9 | ... | -0.9 |

$$X'$$

| Soil | Terrain | Diameter |
|---|---|---|
| 5 | 4 | 9 |

*FIG. 30*

PREDICTING PIPE FAILURE

REFERENCE TO RELATED APPLICATIONS

This patent application claims the benefit of and incorporates by reference each of the following provisional applications:
U.S. Prov. Ser. No. 62/649,058 filed Mar. 28, 2018;
U.S. Prov. Ser. No. 62/658,189 filed Apr. 16, 2018;
U.S. Prov. Ser. No. 62/671,601 filed May 15, 2018;
U.S. Prov. Ser. No. 62/743,477 filed Oct. 9, 2018;
U.S. Prov. Ser. No. 62/743,483 filed Oct. 9, 2018; and
U.S. Prov. Ser. No. 62/743,485 filed Oct. 9, 2018.

This patent application is related to and incorporates by reference the following US and PCT applications filed on even date herewith: U.S. patent application Ser. No. 16/365,522; Int'l Pat. Appl. No. PCT/US19/24141; and Int'l Pat. Appl. No. PCT/US19/24139, which are referred to collectively as the "Co-Pending Patent Applications".

FIELD

This patent specification generally relates to improved systems and methods for predicting pipe failures. More particularly, some embodiments relate to an improved systems and methods for predicting future breaks of pipelines such as water pipe mains.

BACKGROUND

More than one million miles of water pipe in the United States alone are reaching the end of their useful life and are in need of replacement. Over the next 25 years, at least one trillion dollars will need to be invested in order to maintain the current level of service for a growing population. Ignoring the problem will lead to higher repair costs and increased service disruptions.

In the United States, the approximately 50,000 water utility companies do not have the resources to replace them all, due to limited budgets. Since all expired pipe cannot be replaced, it is vital that replacing pipes in the worst condition be prioritized while strategically leaving expired but healthy pipe to be replaced in the future.

The replacement plans that utility companies have created are fairly inaccurate and in many cases are not useful. The simplistic models that utility companies have created have led to the wasteful replacement of pipe that still would have had more years of life. Over the next twenty-five years, this would lead to millions of dollars of wasteful spending.

SUMMARY

According to some embodiments, a method is described for predicting pipe leaks in a network of underground pipes for carrying a fluid, such as fresh water or natural gas to consumers. The method includes: receiving by a computer system a first set of variables relating to leakage of the pipes, the first set of variable being at least 60 variables; selecting automatically by the computer system a second set of variables being a subset of the first set of variables; building a mathematical model using machine learning based on the second set of variables; and predicting likelihood of pipe segments leaking based on the model. According to some embodiments, the pipes can be used for carrying other types of fluid such as: waste water, recycled water, brackish water, storm water, sea water, drinking water, steam, compressed air, oil and natural gas.

According to some embodiments, the selecting includes building a model based on the first set of variables and evaluating importance associated with each variable in the first set based said initial model. The evaluation of importance can be based on coefficients such as Gini coefficients or information gain coefficients. According to some embodiments, at least some of the first set of variables are assigned to predetermined categories and no more than predetermined number of variables in each category are included in the second set.

According to some embodiments, the number of variables in the first is at least 100, 300, 800 or 1000 variables. According to some embodiments, the number of variables in the second set is less than 100, 60, 40, 20 or 12 variables. According to some embodiments, the number of variables in the second set is less than 50% of the first set. According to some embodiments, the number of variables in the second set is less than 25% of the first set.

According to some embodiments, a portion of the first set of variables are generated by geospatial analysis. According to some embodiments, at least some of the variables of the first set include data pertaining to pipes which have never leaked, and the selection is based at least in part on the non-leaker data.

According to some embodiments, the network of pipes is for a first customer utility company and said building the model includes using data from a second customer utility company. According to some embodiments, the building of the model includes using data from an integrated national utility database. According to some embodiments, the building the model is based at least in part on a plurality of models each being based on data from different time intervals.

According to some embodiments, a system is described for predicting pipe leaks in a network of underground pipes for carrying fluid to consumers. The system includes: a database that stores a first set of variables relating to leakage of the pipes, the first set of variables being at least 60 variables; and a processing system configured to automatically select a second set of variables being a subset of the first set of variables, and to build a model using machine learning based on the second set of variables; and to predict likelihood of pipes segments leaking based on the model.

As used herein, the grammatical conjunctions "and", "or" and "and/or" are all intended to indicate that one or more of the cases, object or subjects they connect may occur or be present. In this way, as used herein the term "or" in all cases indicates an "inclusive or" meaning rather than an "exclusive or" meaning.

BRIEF DESCRIPTION OF THE DRAWINGS

To further clarify the above and other advantages and features of the subject matter of this patent specification, specific examples of embodiments thereof are illustrated in the appended drawings. It should be appreciated that elements or components illustrated in one figure can be used in place of comparable or similar elements or components illustrated in another, and that these drawings depict only illustrative embodiments and are therefore not to be considered limiting of the scope of this patent specification or the appended claims. The subject matter hereof will be described and explained with additional specificity and detail through the use of the accompanying drawings in which:

FIGS. 14A and 14B are diagrams illustrating aspects of predicting missing pipe data values, according to some embodiments;

FIG. 17 is a diagram illustrating cleaning of example pipe data, according to some embodiments;

FIG. 30 is a diagram illustrating ranking a number of representative features by importance from 1 to 10, according to some embodiments.

DETAILED DESCRIPTION

Figure 1:
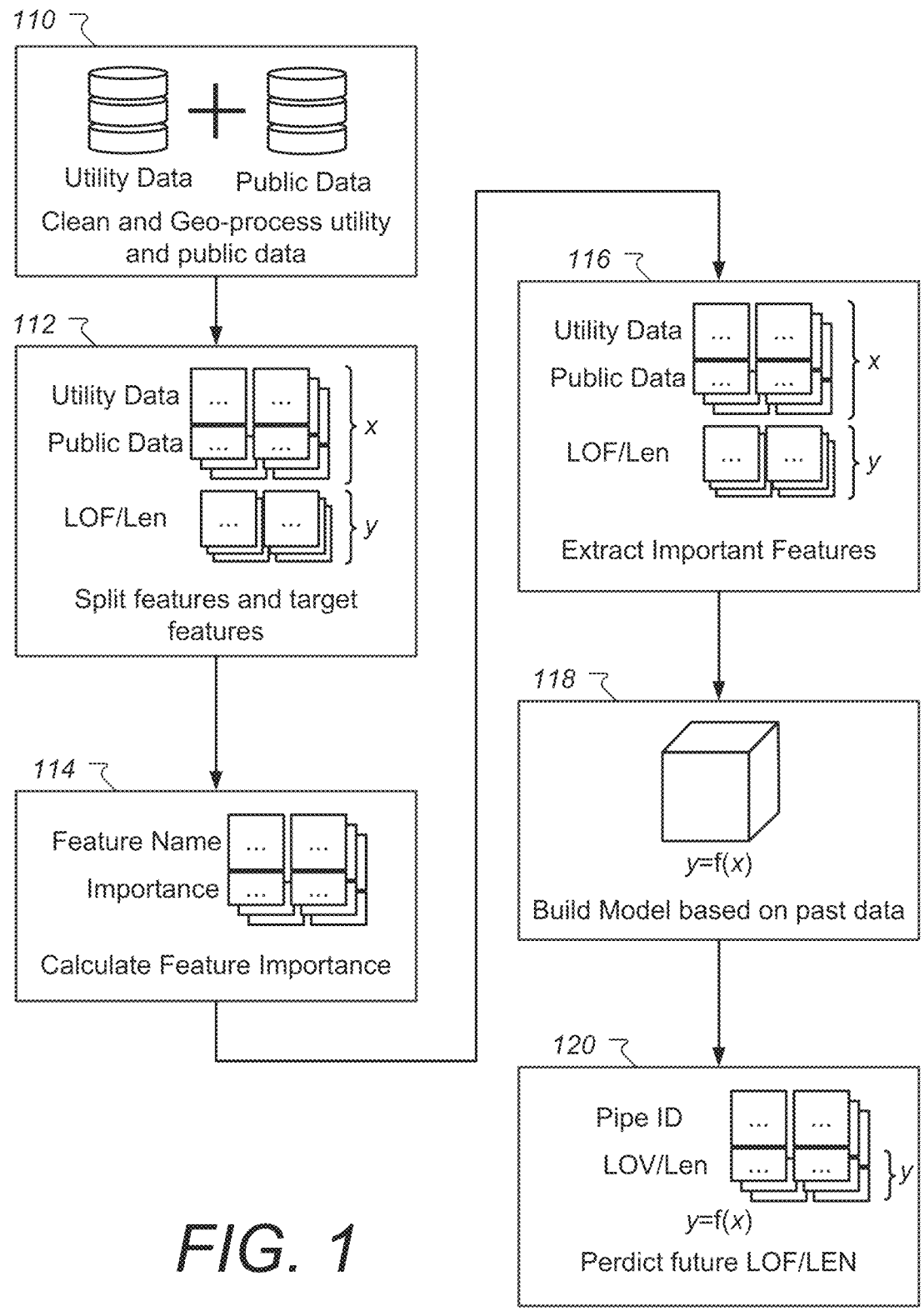
FIG. 1 is a diagram illustrating aspects of processing models used for predicting pipe failure, according to some embodiments.

A detailed description of examples of preferred embodiments is provided below. While several embodiments are described, it should be understood that the new subject matter described in this patent specification is not limited to any one embodiment or combination of embodiments described herein, but instead encompasses numerous alternatives, modifications, and equivalents. In addition, while numerous specific details are set forth in the following description in order to provide a thorough understanding, some embodiments can be practiced without some or all of these details. Moreover, for the purpose of clarity, certain technical material that is known in the related art has not been described in detail in order to avoid unnecessarily obscuring the new subject matter described herein. It should be clear that individual features of one or several of the specific embodiments described herein can be used in combination with features of other described embodiments or with other features. Further, like reference numbers and designations in the various drawings indicate like elements.

According to some embodiments, an improved solution is described for the accurate prediction of a pipe's condition. The described methods apply a data-driven approach that uses a combination of information acquisition, classification, regression, and/or machine learning. The various systems and methods described herein provide for a number of advantages over conventional techniques. It has been found that various systems and methods described herein result in substantial improvements in leak prediction performance. In particular, some of the embodiments described herein can result in one or more of the following improvements over conventional techniques: a reduction or elimination of the need to excavate pipes to assess condition, thereby significantly reducing costs; identifying risks of breaks based on hundreds of variables including soil properties, climate, shore proximity, and rail lines; identifying correlations that would be difficult or impossible for humans to identify; increasing accuracy in predicting future pipe condition; allowing for increases in the complexity of the leak prediction problem; and/or increasing ease, decreasing cost and/or decreasing time used in scaling to pipe replacements for many water utility companies.

According to aspects of the present disclosure, a system for prioritizing the replacement of underground pipes comprises a database that stores information, including pipe data, pipe break data, and external data including geographically specific data; a memory that stores at least one program having program instructions; a network interface coupled to at least one computer; and a processor, coupled to the database, the network interface and the memory. The processor is capable of executing the program instructions of the at least one program to cause the processor to: (a) input and process pipe data, pipe break data and external from the database to create clean data for a network of pipes; (b) generate potential features within the clean data to use in pipe life of failure prediction models; (c) calculate the importance of the potential features; (d) extract the most important features; (e) apply the extracted features to a likelihood of failure model created based on historical data and machine learning; (f) predict future likelihood of failure for each pipe in the network of pipes; and (g) transmit the likelihood of failure for each pipe to a computer associated with the customer of the network of pipes.

In a further aspect of the disclosure, the machine learning model is a mixed model that has a model component build based on pipe and external data, without pipe break data, and a model component based on pipe data, pipe break data and external data, and wherein the prediction is done based on both model components.

In another aspect of the disclosure, one of the at least one programs stored in the memory is a web interface that enables a customer to upload to the database pipe data, and pipe break data for the customer's network of pipes.

In still a further aspect, the program further includes a presentation program, which enables presenting to the user a graphical depiction of the pipes in the customer's network and the likelihood of failure of each pipe over a particular, future time period.

In another aspect, the model for a future multi-year period is based in part on models for the pipes in the network over at least one prior, multi-year period. In addition, the external data includes data on conditions of the pipe, including soil data, weather data, and elevation data.

According to aspects of the disclosure, a method for prioritizing the replacement of underground pipes comprises, inputting and processing pipe data, pipe break data and external from the database to create clean data for a network of pipes; generating potential features within the clean data to use in pipe life of failure prediction models; calculating the importance of the potential features; extracting the most important features; applying the extracted features to a likelihood of failure model created based on historical data and machine learning; predicting future likelihood of failure for each pipe in the network of pipes; and transmitting the likelihood of failure for each pipe to a computer associated with the customer of the network of pipes.

According to another aspect, the method uses a machine learning model that is a mixed model that has a model component build based on pipe and external data, without pipe break data, and a model component based on pipe data, pipe break data and external data, and wherein the prediction is done based on both model components.

According to yet another aspect, the method uses at least one program stored in the memory that is a web interface that enables a customer to upload to the database pipe data, and pipe break data for the customer's network of pipes. In addition, the program further includes a presentation program, which enables presenting to the user a graphical depiction of the pipes in the customer's network and the likelihood of failure of each pipe over a particular, future time period.

According to still another aspect, the model for a future multi-year period is based in part on models for the pipes in the network over at least one prior, multi-year period. In addition, the external data includes data on conditions of the pipe, including soil data, weather data, and elevation data.

According to aspects of the disclosure, a computer program product comprises computer program logic stored therein, that causes a server to determine likelihood of failure of a network of pipes, the computer program logic comprising: inputting and processing logic that causes the server to input and process pipe data, pipe break data and external from the database to create clean data for a network of pipes; generating logic that causes the server to generate potential features within the clean data to use in pipe life of failure prediction models; calculating logic that causes the server to calculate the importance of the potential features; extracting logic that causes the server to extract the most important features; applying logic that causes the server to apply the extracted features to a likelihood of failure model created based on historical data and machine learning; predicting logic that causes the server to predict future likelihood of failure for each pipe in the network of pipes; and transmitting logic that causes the server to transmit the likelihood of failure for each pipe to a computer associated with the customer of the network of pipes.

In accordance with another aspect, the computer program product includes a machine learning model that is a mixed model that has a model component build based on pipe and external data, without pipe break data, and a model component based on pipe data, pipe break data and external data, and wherein the prediction is done based on both model components.

In accordance with yet another aspect, the computer program product includes web interface logic that causes the server to enable a customer to upload to the database pipe data, and pipe break data for the customer's network of pipes.

In addition, the web interface logic further includes a presentation program, which enables the server to present to the customer a graphical depiction of the pipes in the customer's network and the likelihood of failure of each pipe over a particular, future time period.

In accordance with still another aspect, the model for a future multi-year period is based in part on models for the pipes in the network over at least one prior, multi-year period.

As used herein the following terms have the following meanings: "Leaker"—a pipe which has broken N times (N is integer and greater than 0); "Nonleaker"—a pipe which has never broken; "Public Data"—data which is publicly available and/or available through governmental sources, e.g. soil data, climate data, etc; "Utility Data"—data provided by a water utility company (which can be further divided into "Pipe Data" and "Break Data"); "Pipe Data"—geographic pipe data, including information on installation year, material, diameter, pressure, etc.; "Break Data"/"Break History"—break record of pipes including location, relevant pipe IDs, and date; "Prediction Model for xxxx (Eg. 2017)"—a prediction model to predict future pipe breaks which will occur in next N(>0) years from the first day of year xxxx, and the model is built without using break data which occurs right after the day; "Model"—a mathematical equation such as f(x); "Modeling"—the building of a model such as f(x); "Ensemble"—a Machine Learning term wherein a result is predicted based on results of multiple models; "Features"—corresponds with x in y=f(x), where machine learning predicts target features from features; and "Target features"—corresponds with y in y=f(x), where machine learning predicts target features from features. Note that the use of term "public" when used in "public data" does not necessarily mean than the data is generally available to the public free of charge. Rather it means that the data is available from a pooled resource such as a governmental agency (e.g. USGS soil data).

An important use case of Machine Learning in the water industry is in likelihood of failure ("LOF") analysis, otherwise known as condition assessment. Many utility companies (or "utilities") presume older pipes are in worse conditions than newer pipes. However, often older pipes especially older cast-iron pipes have demonstrated remarkable robustness despite their installation 80 to 100 years prior, whereas newer pipes, only installed in more recent decades show considerable deterioration, are often near failure. Therefore, simply replacing pipes of a particular age, while failing to consider multiple different variables can be wasteful.

In connection with the prediction of future pipe breaks, the current disclosure may implement machine learning techniques. Machine Learning can be used to build a model to represent a target; that is, to build a function "f" which works in the form of y=f(x), where x and y are features and target features respectively. In the current disclosure, machine learning may be used to derive the following models:

Probabilities of future pipe breaks=$f$(pipe data+break data+public data)

or

Probabilities of future pipe breaks=$f$(pipe data+public data)

Deriving a model based on available data can be referred to as "training." In this training phase, labeled data may be used to iterate and build a model of how different features correlate with the target feature. Once a model is built, it is then tested against validation data in order to evaluate the accuracy of the model in a process called cross-validation.

In accordance with aspects of the disclosure, a form of the Random Forest process may be used, which may constitute a method of regression composed of a large number of individual decision trees. In particular, a decision tree may be used in which a series of true/false questions systematically places a piece of data into a specific category, thereby making a 'decision' about what category the input belongs to. For example, a simple decision tree may determine, based on a series of true/false questions, (such as questions surrounding weather, location etc.), if a pipe is likely to fail. A random forest expands on this and utilizes a number of additional decision trees to derive an answer.

One tree may ask a number of true/false questions accounting for the material of the pipe, diameter of the pipe, temperature etc. Another tree may account for the location and slope of the pipe, with another for weather, and traffic data. The random forest then calculates the number of different trees that decide one outcome versus another, i.e. will the pipe fail, and a final answer or recommendation may be determined based on which outcome has been identified by a majority, or some other threshold, of trees.

FIG. 1 is a diagram illustrating aspects of processing models used for predicting pipe failure, according to some embodiments. In block 110, utility data and public data are cleaned and geo-processed. Before a machine learning analysis is performed, data is collected. For example, the current disclosure provides for a web interface though which water utilities may upload utility data, including pipe data and break data. The web interface may be designed so as to accept various formats of utility data, including, but not limited to, shapefiles, CSVs, and GeoJSONs. This data may be transferred to a utility database. Here, utility data from various locations may be stored. For example, utility data from across the country may be stored in a standardized format. The data may also be geo-processed, so that it may be accessed or identified in connection with geographic data. The data is combined with public data (such as climate, soil, transportation data, etc.). For example, a server may be programmed, or otherwise configured, to access one or more national databases and collect relevant public data. In addition, the server may be configured to automatically associate the collected public data with particular portions of the utility data. For example, climate and soil data for a particular location may be associated with a particular pipe that is identified in the utility data. New variables may be generated in connection with collected data, while maintaining a consistent format.

A random forest process may then be run on the collected utility data and public data a plurality of times. In block 112, the feature and target features are split. In block 114, feature importance is calculated. In block 116, important features are extracted. In block 118 the model is built based on past data. In applying the random forest process, important variables may be automatically selected, thereby reducing the total variable size and preventing data overfitting. In block 120, the mixed model may then be run that produces accurate likelihood of failure results for both pipes that have leaked many times and those that have not. From these results, pipe replacement plans may be created, which focus on the areas with the worst likelihood of failure ("LOF"). In particular, the mixed model results may be used to produce LOF rankings, wherein pipes are identified with a plurality of rankings based on their predicted LOF. In addition, a financial simulation may be run which highlights the savings made from performing jobs based on the determined LOF results.

Figure 2:
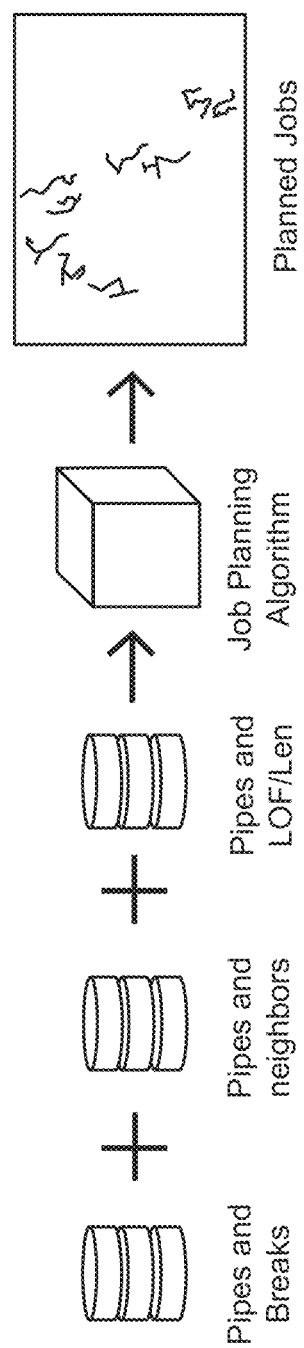
FIG. 2 is a diagram illustrating aspects of job planning based on models used for predicting pipe failure, according to some embodiments.

FIG. 2 is a diagram illustrating aspects of job planning based on models used for predicting pipe failure, according to some embodiments. Most water utilities possess pipe data and break data. However, sometimes their data is not digitized or certain data is missing. In accordance with aspects of the disclosure, utility customers may be categorized based, in part, on the amount or type of pipe data and break data that is accessible for that customer. In turn different models may be used in connection with different categories of utility customers. For example, customer categories may be divided into the following five cases: reused model—too small a utility or no digitized break data; ensemble of generic models to predict LOF in next 1 year—enough pipe/virtual pipe data, but only 1-2 years of break data; ensemble of generic models to predict LOF in next 3 years—enough pipe/virtual pipe data, but only 3-5 years of break data; ensemble of leakage and generic models to predict LOF in next 3 years—enough pipe/virtual pipe data, but only 6-9 years of break data; and ensemble of leakage and generic models to predict LOF in next 5 years—enough pipe/virtual pipe data, but only +10 years of break data.

Figure 3A:
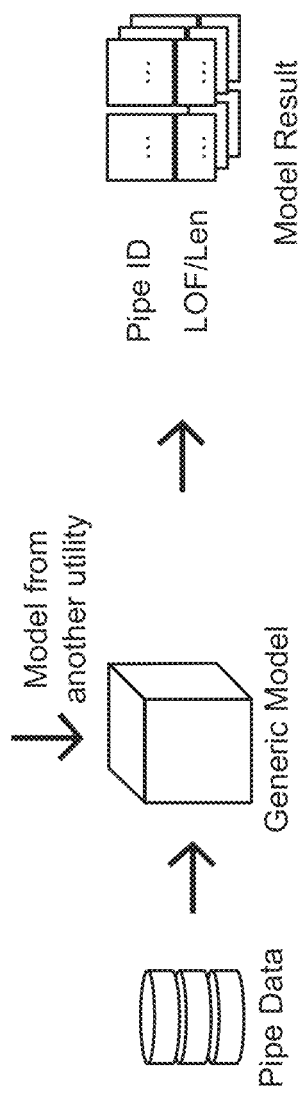
FIGS. 3A to 3C are diagrams illustrating aspects of different water utility company customer categories, according to some embodiments.
Figure 3B:
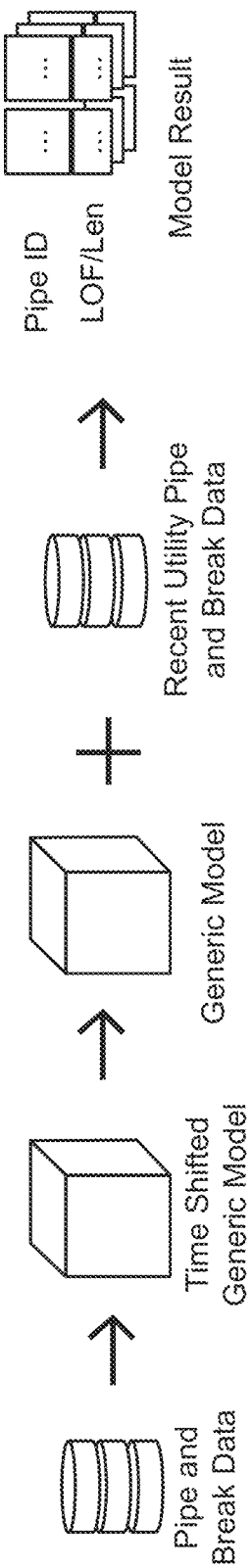
Figure 3C:
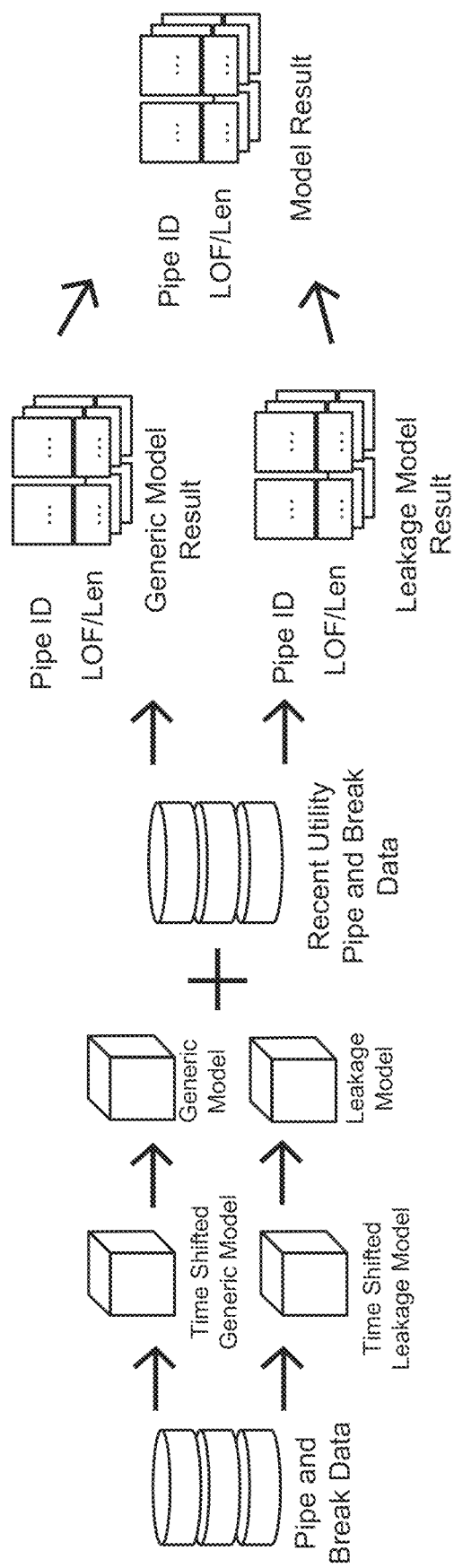

FIGS. 3A to 3C are diagrams illustrating aspects of different water utility company customer categories, according to some embodiments. FIG. 3A depicts a reused model case. Certain utilities have insufficient pipe and break data, and there are several reasons why this can occur. One example is a utility that is too small for the disclosed process to be effectively run. Another is a utility that does not have its pipe and break data digitized or otherwise recorded. For utilities that have digitized data but insufficient pipe and break data, a model built from the data of another utility may be used on the targeted utility. A utility in this case may be identified based on whether the amount of available pipe and break data are less than particular thresholds.

FIG. 3B depicts a case of ensemble of generic models. Certain utilities have sufficient pipe data but insufficient break data. In many cases, this is due to only having the past several years of data, which may not be enough to build a comprehensive model. In order to solve this issue, a generic model is built using that utility's break history. The number of years the model is able to predict is based on how much break data the model has.

FIG. 3C depicts a case of ensemble of generic and leakage models. For utilities with enough pipe and break data, a unique model for the utility may be built using the utility's pipe and break data. This model may include both a generic and leakage model. The utility's data may then be uploaded to an integrated utility database. Depending on the size of the utility, the model can be combined with other utility data in order to build a more comprehensive model.

Figure 4:
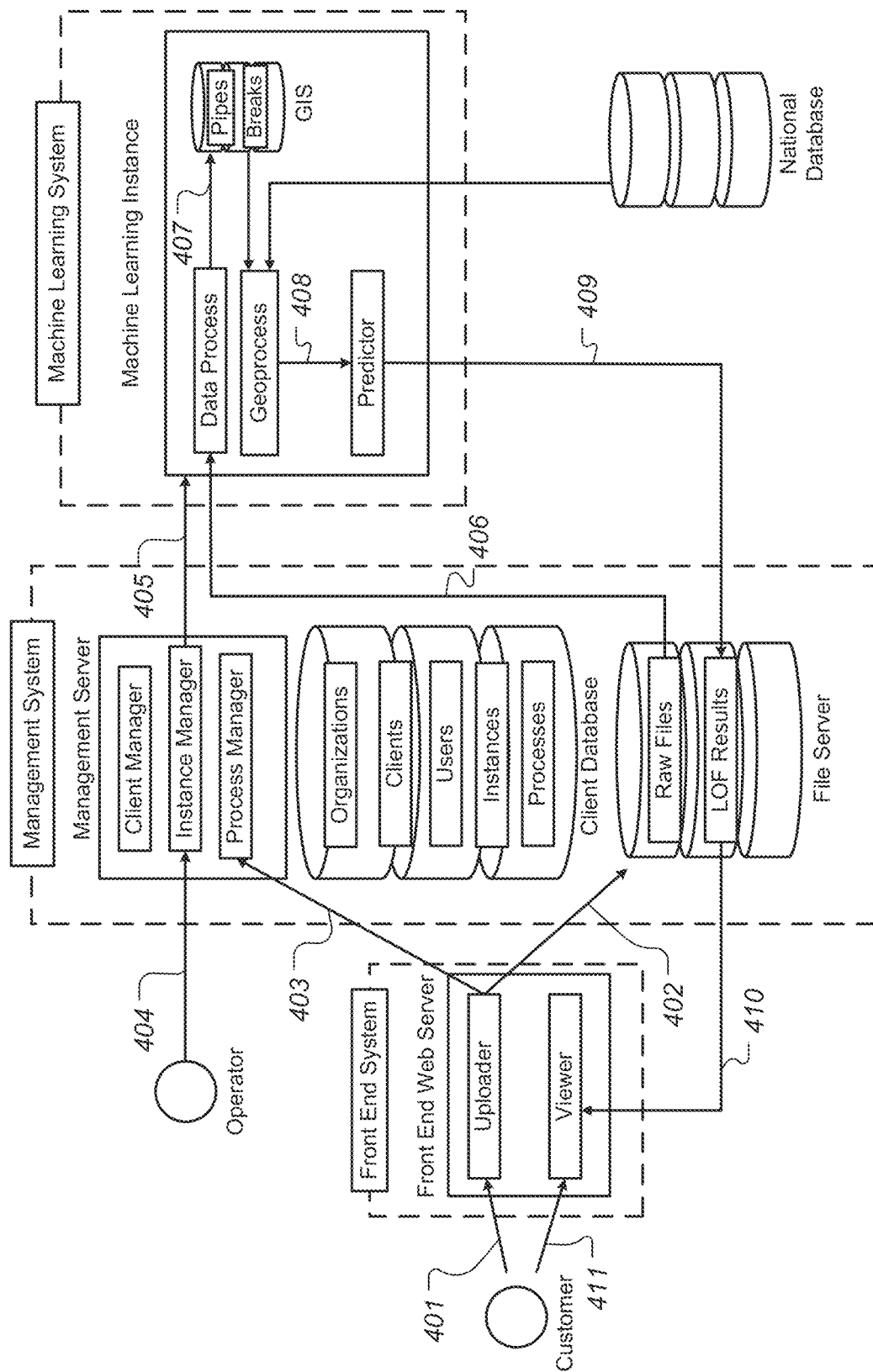
FIG. 4 is a diagram illustrating aspects of an architecture for predicting pipe failure, according to some embodiments.

FIG. 4 is a diagram illustrating aspects of an architecture for predicting pipe failure, according to some embodiments. The architecture includes a front end interface, a management system and a machine learning system. The front end interface includes: a page for uploading pipe data, break data, and any supplemental data; a page for viewing basic statistics on pipe network, breaks, and end-of-useful life statistics; a page for viewing the results of the machine learning analysis in both a map view and with supplemental statistics; a page for downloading maps of cleaned data and machine learning results as well as downloading statistics; and an interface allows small utilities to access Fracta's solution even without the right data or software. The management system includes: a management server for the creation of instances and processes; a database containing client information; and a file server for hosting files. The machine learning system (instance) includes: scripts for spatial joining, geoprocessing, and machine learning; and a temporary database for hosting files.

Referring to FIG. 4, in step 401, the customer log in and uploads data. In step 402, the customer's data is uploaded and in step 403 a request is made to the process manager of the management server. In step 404 the operator (i.e. the pipe failure prediction company operator) logs in and issues a request to the instance manager of the management server. In step 405 the instance manager issues a request to the machine learning instance of the machine learning system. In step 406, the raw files from the file server are loaded to the data process of the machine learning instance. In step 407, data process inserts pipes and breaks data in the GIS database. The geoprocess receives information from the GIS and the national database. In step 408 the geoprocessed information is fed to the predictor. In step 409, the predicted results are transferred to the likelihood of failure (LOF) results on the file server. In step 410, the LOF results are uploaded to the front end viewer. In step 411, the customer log in and view/downloads the LOF data.

In predicting the probability of a pipe breaking one time within the next five years, aspects of the current disclosure may use a Poission distribution of particular data. For example, the probability of a break may be calculated as follows:

$$\text{Prob} = 1 - e^{(-\text{Number of Breaks/Pipe Length})}$$

Figure 5:
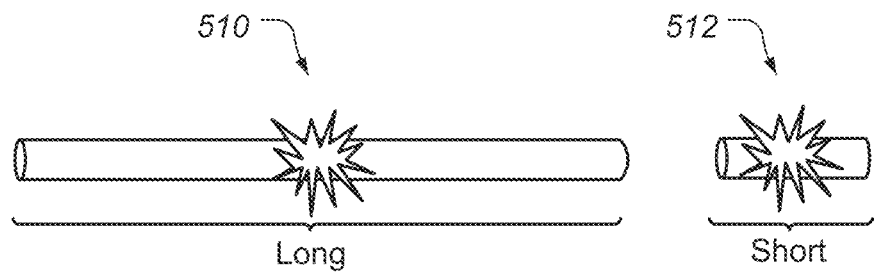
FIG. 5 illustrates that breaks per unit length (LOF/Length) may be different.

Instead of a Binary Classification (Will a pipe break or not?), the Poisson distribution allows for probability calculations. To reach a final result, the following original format of the distribution may be used:

$$\text{Prob} = \frac{(m^k * e^{-m})}{k!}$$

Where "k" represents the number of times an event (e.g., a break) occurs in an interval of time, and "m" corresponds to a determined average number of events per interval of time. FIG. 5 illustrates that breaks per unit length (LOF/Length) may be different. Longer pipe 510 may have a different LOF/Length than shorter pipe 512. Length (L) of the pipe may then be added into the equation:

$$\text{Prob} = \frac{\left(\left(\frac{m}{L}\right)^k * e^{\frac{-m}{L}}\right)}{k!}$$

In order to calculate the probability of a break in the next 5 years (instead of one year), the equation may be edited to have five entries as follows:

$$\text{Prob} = \frac{\left(\left(\frac{m}{L}\right)^1 * e^{\frac{-m}{L}}\right)}{1!} + \frac{\left(\left(\frac{m}{L}\right)^2 * e^{\frac{-m}{L}}\right)}{2!} + \frac{\left(\left(\frac{m}{L}\right)^3 * e^{\frac{-m}{L}}\right)}{3!} + \frac{\left(\left(\frac{m}{L}\right)^4 * e^{\frac{-m}{L}}\right)}{4!} \ldots$$

This probability is then edited to the following form:

$$\text{Prob} = 1 - (\text{Probability Pipe Doesn't Break})$$
$$= 1 - \frac{\left(\left(\frac{m}{L}\right)^0 * e^{\frac{-m}{L}}\right)}{0!}$$
$$= 1 - e^{(-\frac{m}{L})}$$

Figure 6:
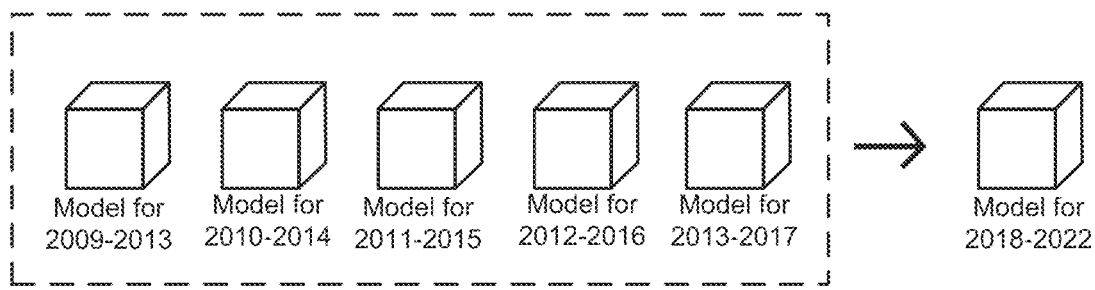
FIG. 6 is a diagram illustrating the use of an ensemble with respect to time for calculating likelihood of failure for the next five years, according to some embodiments.

FIG. 6 is a diagram illustrating the use of an ensemble with respect to time for calculating likelihood of failure for the next five years, according to some embodiments. In order to create a likelihood of failure ranking for each pipe segment that corresponds to the next five years, the likelihood of failure per length may be calculated for every previous year where that data is available. For each year, the top variables affecting the pipe condition may be noted. However, for a specific year, certain conditions are not necessarily the same. For example, a drought may have occurred during certain years which affected the importance of certain variables. To reduce the effect of time-varying changes, the average result for different time slices may be calculated. In this way, the effect of one off events (like storms, droughts, etc.) can be minimized. In addition, correlations that change slowly over time can also be captured.

Figure 7A:
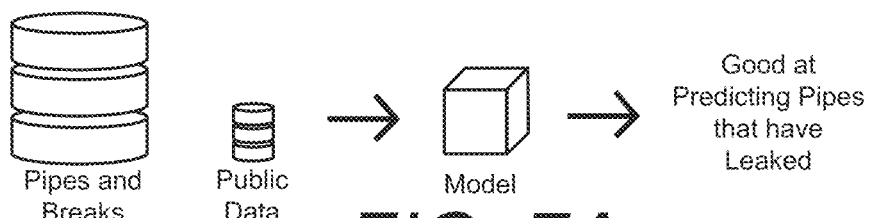
FIGS. 7A and 7B are diagrams illustrating performance differences between prior art techniques (FIG. 7A) and techniques according to some embodiments (FIG. 7B)
Figure 7B:
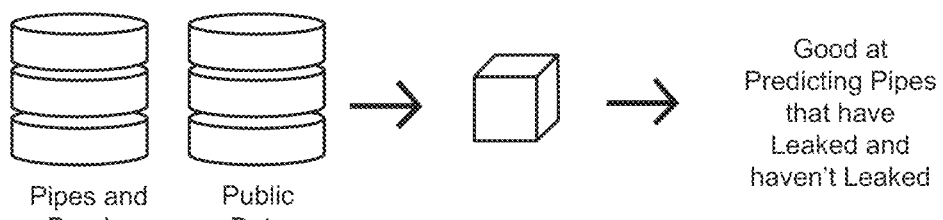

FIGS. 7A and 7B are diagrams illustrating performance differences between prior art techniques (FIG. 7A) and techniques according to some embodiments (FIG. 7B). The machine learning analyses according to some embodiments, as depicted in FIG. 7B, have an advantage of being able to accurately assess the condition of pipes which have never broken before. In contrast, as depicted in FIG. 7A, conventional methods that water utilities use to assess the condition of their pipes typically only highlight pipes which have leaked many times or new pipes that have a low chance of leaking. Since utilities focus so heavily on break history, their analytical methods often fail to accurately assess the condition of weak pipes which have never leaked. However, through the use of variables representing the surrounding pipe conditions, the disclosed system and methods can identify pipes with higher potential for failure and assign them higher likelihood of failure values. Using a generic model that does not rely on specific break data allows for a more accurate assessment of the condition of pipes that have never broken before.

Figure 8A:
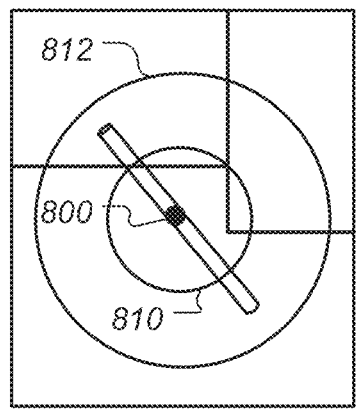
FIGS. 8A and 8B are diagrams illustrating variables generated through geospatial analysis, according to some embodiments.
Figure 8B:
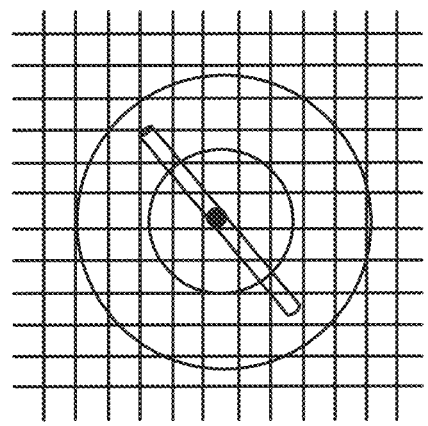

FIGS. 8A and 8B are diagrams illustrating variables generated through geospatial analysis, according to some embodiments. In creating the variables that represent the condition in which each pipe exists, more than a single feature to represent each category may be needed. For example, the pH value of the nearest soil region (e.g., geospatial polygon) may not sufficiently represent the complex variations of the pH around the pipe. FIG. 8A shows a representation of polygon data surrounding a pipe of interest and FIG. 8B shows a representation of more granular raster data surrounding the pipe of interest. In order to get more granular data, several steps may be undertaken. First, the centroid (800) of each pipe segment may be extracted. Next, N circles of varying sizes may be created (e.g. circles 810 and 812) which are centered on the centroid of the pipe segment. Statistical values (e.g., maximum, minimum, standard deviation, median, mean, difference of maximum and minimum, number of unique values) may then be calculated based on the geo-variables within the N circles. These values may then be assigned to each pipe segment. By taking the values within the N circles of multiple radii around the pipe segment, more information can be determined regarding the surrounding conditions. Potential variables that may be used are listed in Table 1.

TABLE 1

| Potential Pipe Condition Variables | |
|---|---|
| Elevation | Elevation (Mean) |
| | Elevation (Median) |
| | Elevation (Max) |
| | Elevation (Min) |
| | Elevation (Standard Deviation) |
| Soil Type Density | Soil Type Density |
| Numeric Soil | pH |
| Properties | Calcium Carbonate (CaCO3) |
| | Cation-Exchange Capacity (CEC-7) |
| | Electrical Conductivity (EC) |
| | Effective Cation-Exchange Capacity (ECEC) |
| | Linear Extensibility |
| | Representative Slope |
| | Percent Clay |
| | Percent Sand |
| | Percent Silt |
| | Sodium Adsorption Ratio (SAR) |
| | Gypsum |
| | Bulk Density, One-Third Bar |
| | Frost-Free Days |
| | Soil Health—Organic matter |
| | Organic matter |
| | Available Water Capacity |
| | Available Water Storage |
| | Available Water Supply, 0 to 25 cm |
| | Available Water Supply, 0 to 50 cm |
| | Available Water Supply, 0 to 100 cm |
| | Available Water Supply, 0 to 150 cm |
| | Water Content, One-Third Bar |
| | Water Content, 15 Bar |
| | Saturated Hydraulic Conductivity (Ksat) |
| | Saturated Hydraulic Conductivity (Ksat), Standard Classes |
| | K Factor, Rock Free |
| | K Factor, Whole Soil |
| | T Factor |
| | Depth to Water Table |
| | Depth to a Selected Soil Restrictive Layer |
| | Depth to Any Soil Restrictive Layer |
| | Liquid Limit |
| | Plasticity Index |
| | Wind Erodibility Index |
| Categorical Soil | Drainage Class |
| Properties | AASHTO Group Classification (Surface) |
| | Frost Action |
| | Flooding Frequency Class |
| | Hydrologic Soil Group |

TABLE 1-continued

| Potential Pipe Condition Variables | |
|---|---|
| | Ponding Frequency Class |
| | Surface Texture |
| | Unified Soil Classification (Surface) |
| | Wind Erodibility Group |
| | Corrosion Concrete |
| | Corrosion Steel |
| Population | Population in 2000 |
| | Population Density in 2000 |
| Precipitation | 30 years Average of Precipitation (1981-2010) |
| Temperature | 30 years Average of Temperature Max (1981 1' 2010) |
| | 30 years Average of Temperature Mean (1981-2010) |
| | 30 years Average of Temperature Min (1981 1' 2010) |
| Shoreline | Distance from Shoreline |
| Road | Distance from Primary Road |
| | Distance from mortorway, motorway_link |
| Rail | Distance from Regular railway tracks |
| | Distance from Light railway Tracks |
| | Distance from Subway Tracks |
| | Distance from Tram Tracks |
| Rail Station | Distance from Railway Station |
| | Distance from Railway Halt |
| | Distance from Tram Stop |
| Bus Stop | Distance from Bus Stop |
| | Distance from Bus Staiton |
| Linear Water | Distance from River |
| | Distance from Stream |
| | Distance from Canal |
| | Distance from Drain |
| Area Water | Distance from Area Water |
| | Distance from Lake and Large River |
| | Distance from Reservoir (Artificial Lake) |
| | Distance from Glacier |
| | Distance from Dock |
| | Distance from Weland |
| Building | Number of Building |
| | Area of Building |

Figure 9:
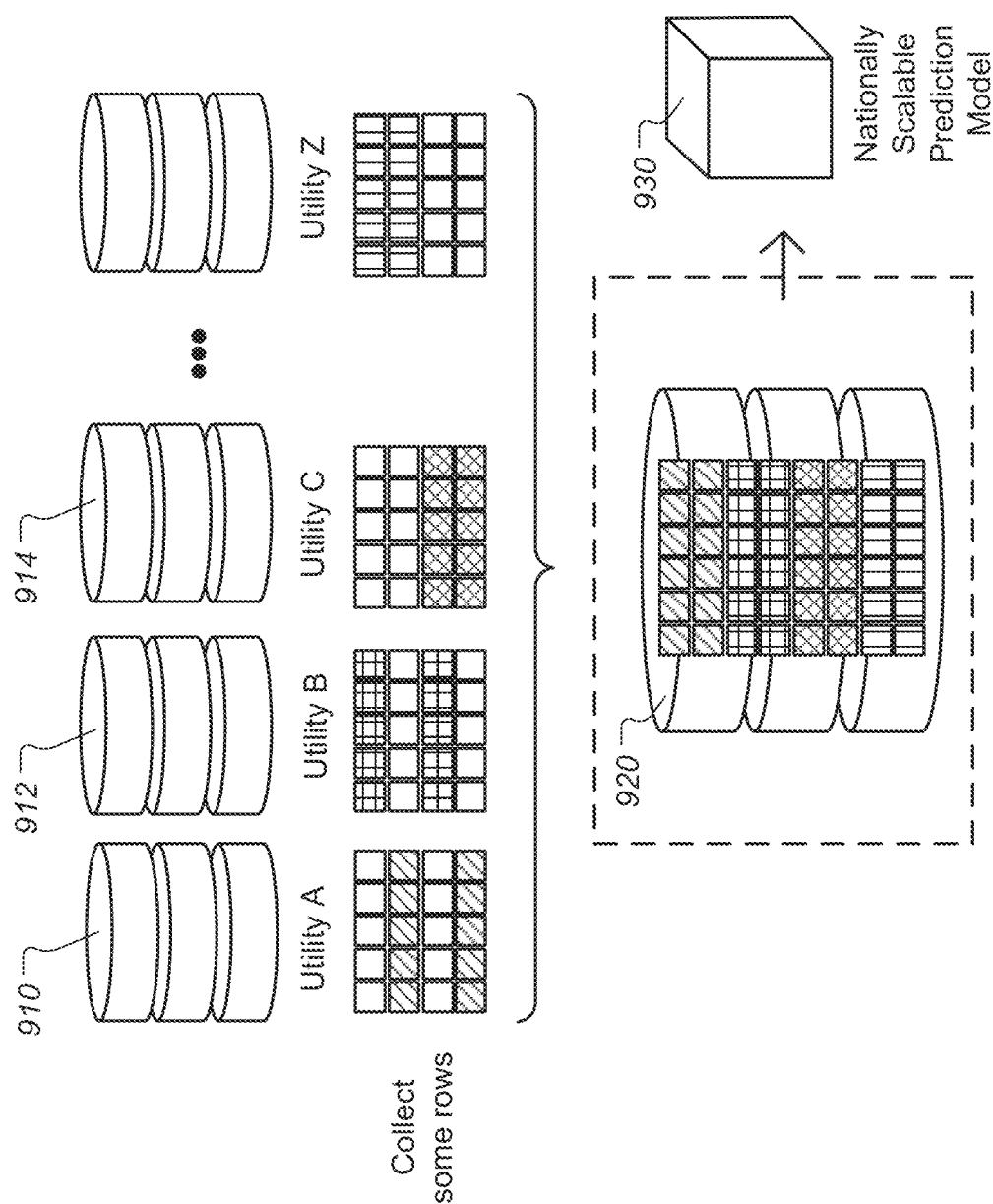
FIG. 9 is a diagram illustrating building an integrated utility database for predicting pipe failures, according to some embodiments.

FIG. 9 is a diagram illustrating building an integrated utility database for predicting pipe failures, according to some embodiments. Selected data from utility databases 910, 912 and 914 are integrated into data base 920. The integrated database 920 is then used to build a nationally scalable prediction model 930. By compiling all pipe and break history of different utilities around the country, the disclosed machine learning model can be applied to utilities with datasets that are too small or have many missing values. While specific machine learning models are often desirable for each utility in order to provide accurate and localized results there may not be enough data to build such a model. For example, many small, rural utilities often do not have the resources to have their entire pipe and break data digitized or otherwise recorded data. In addition, utilities that have such data may have too many missing values that would render any analysis unreliable. However, by having access to an integrated utility database of pipe and break data, a generic machine learning model can be applied to these utilities. For example, a small northern California utility can use the model built from the data of a larger northern California city. In addition, this information can be leveraged for use in calculating values for the virtual pipe network, as discussed later.

Calculating the likelihood of failure for every pipe segment is a problem that often requires access to information regarding how the data has changed over time. However, for many variables (such as break history, climate, population, etc.) only the most recent data may be available, as older data has not yet been digitized or otherwise recorded. In addition, the relationship of particular variables with time may not be linear. In order to better represent the changes of these variables with time, variables related to time (such as pipe age) may be manipulated. For example, variables related to time are changed using the following functions: log, log 10, natural log, square, cube, square root, cube root, exponential, negative exponential, arcsin, arccos, arctan, and sigmoid.

In order to accurately assess the condition of pipe segments, break data and corresponding sub-variables (e.g., break density, breaks per mile, etc.) may be included in the machine learning analysis. However, over relying on the break data can lead to a leakage problem, where break data can overpower other variables. For example, the model may be very good at identifying pipes that have broken many times as bad pipes, but it may fail to accurately assess pipes with few or no breaks. One might suggest removing the break data completely, yet by doing so, pipes with multiple breaks may not be accurately classified as bad pipes. In order to address these issues, the current disclosure provides for what is called a mixed model. For example, two prediction models may be built: one with a heavy emphasis on breaks (leakage model), and one that does not include break history (generic model). Next, each pipe segment may be classified as a leaker or nonleaker. If the pipe is a leaker, the result from the leakage model is assigned. If the pipe is a non-leaker, the result from the generic model is used. The final likelihood of failure per length may be calculated by taking the average of both models. Alternatively, a weighted average of each model may be taken.

Figure 10:
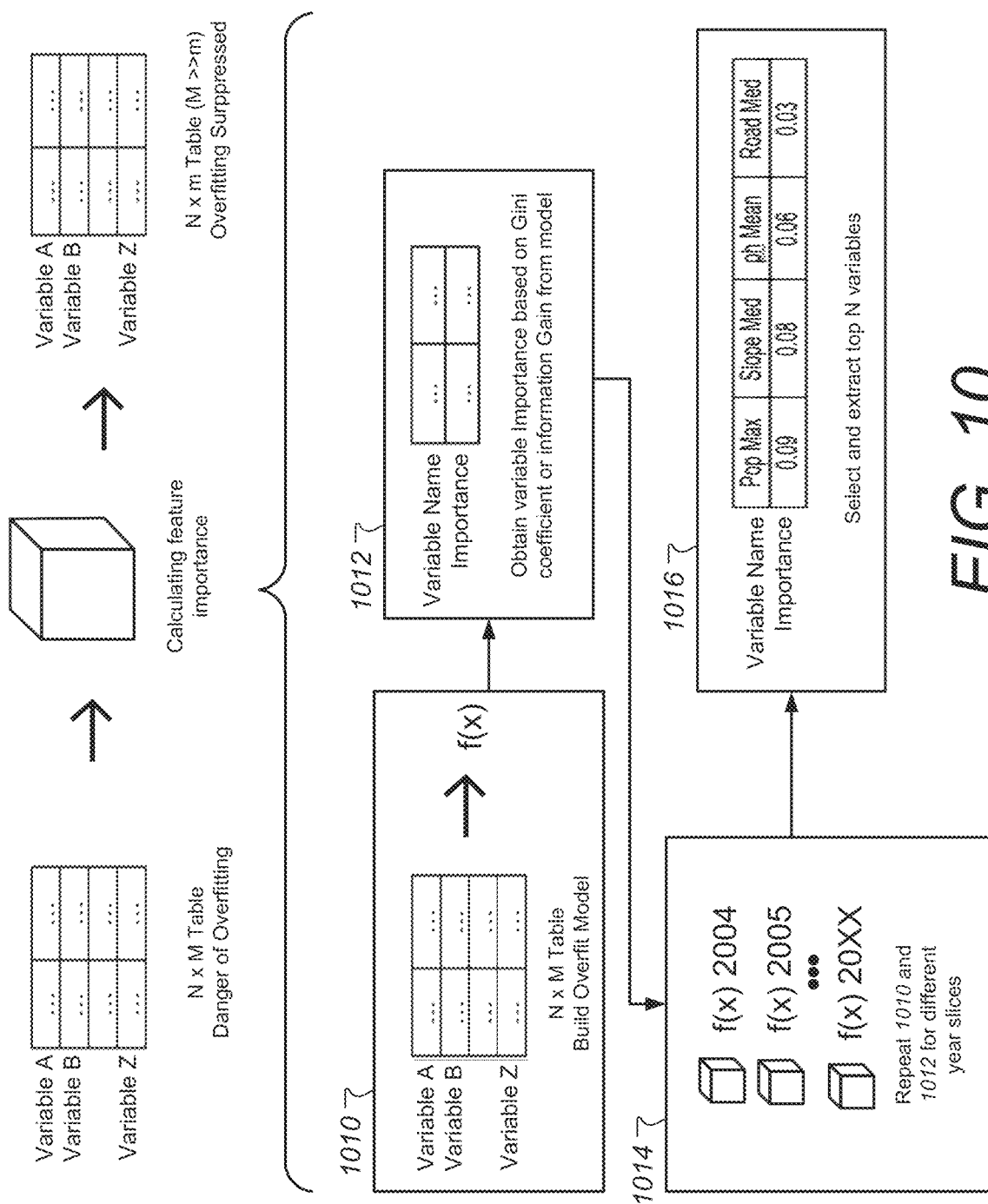
FIG. 10 is a block diagram illustrating aspects of automated variable selection for model-based pipe leak prediction, according to some embodiments.

FIG. 10 is a block diagram illustrating aspects of automated variable selection for model-based pipe leak prediction, according to some embodiments. The current disclosure allows for the collection and creation of over one thousand variables that may be added to the available feature set. However, all of these variables may not be used in a particular machine learning analysis. With a large feature set, there is the danger of overfitting. In overfitting, the machine learning model describes the noise surrounding the model rather than the underlying relationship. While the model may describe the training data accurately, additional data may throw off the model. In order to prevent overfitting, the ensemble method may be run to reduce the variable set. First, in block 1010, the model is run with the entire variable set. In block 1012, the variable importance is obtained. The importance of each variable may be obtained, for example, using techniques such as Gini coefficient or information gain, where a higher coefficient corresponds to a higher importance. In block 1014, blocks 1010 and 1012 are repeated for different year slices. In block 1016, the model may run again with N variables selected from the most important variables list. In some embodiments, the variables may be categorized, so that similar variables are given the same categorization. When choosing variables, it can be advantageous to select only a certain number of variables within the same category. For example, if N variables from the soil pH category are already selected, the less important soil pH variables may be thrown out. For the "Age" and "Material" variable categories, these rules need not be applied, and all variables may be used.

Figure 11B:
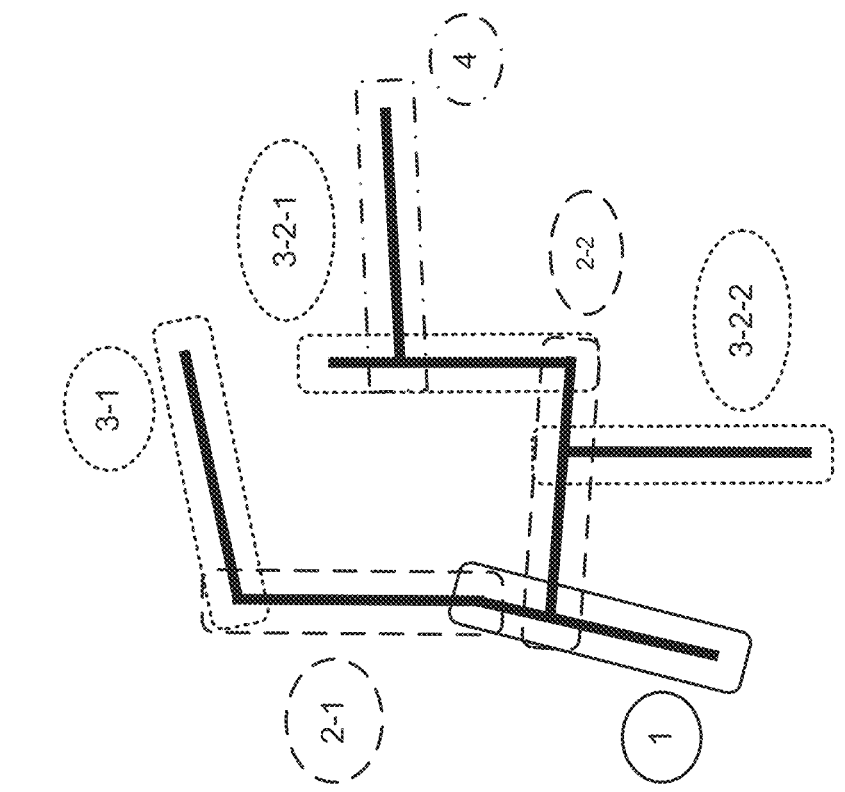
FIGS. 11A and 11B are diagrams illustrating aspects of pipe replacement optimization, according to some embodiments.
Figure 11A:
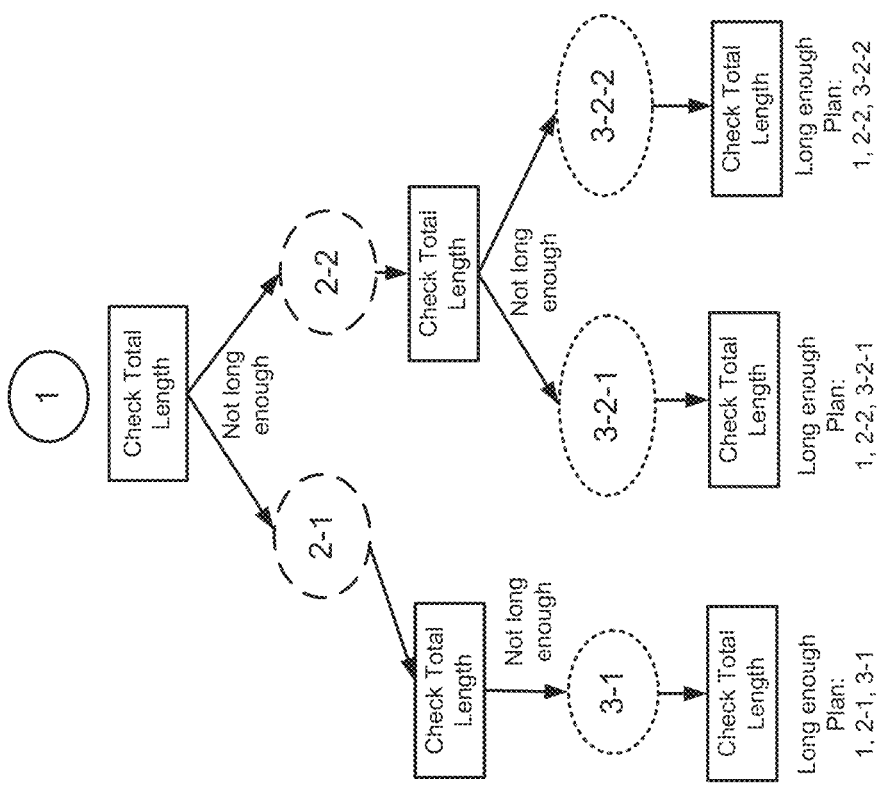
Figure 12:
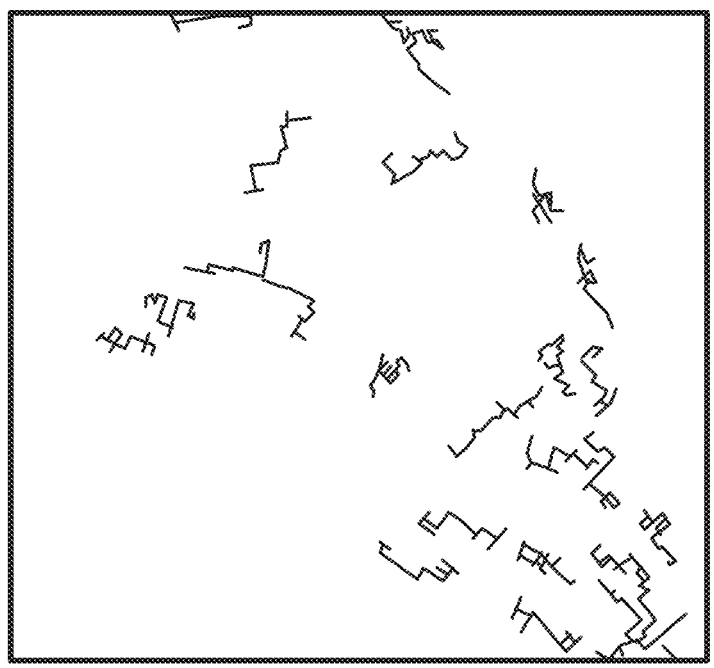
FIG. 12 is an illustration of a possible pipe replacement jobs.
Figure 13A:
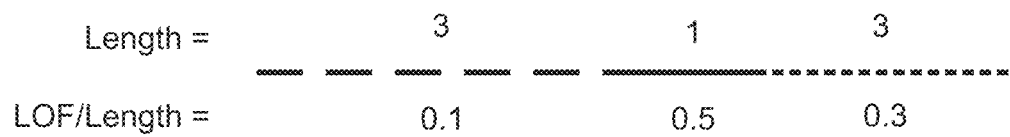
FIGS. 13A to 13C show three different possible pipe replacement jobs under consideration, according to some embodiments.
Figure 13B:
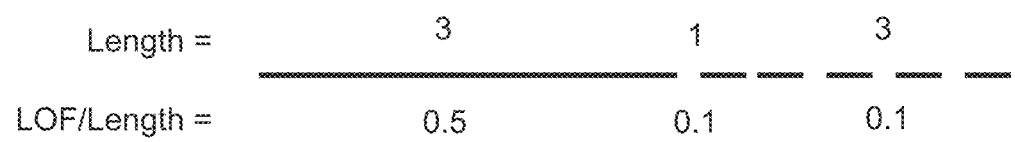
Figure 13C:
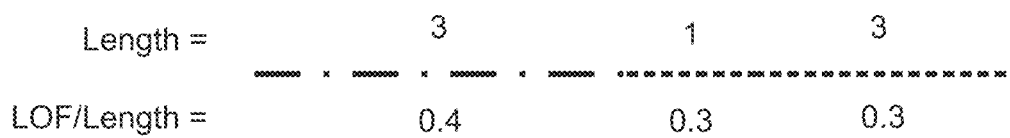

According to some embodiments, pipe replacement jobs are optimized based on the pipe failure prediction results. The results of the disclosed machine learning analysis can provide utilities better insights into the condition of all the pipes in their network. However, this information may not be sufficient for effective job planning (e.g., determining which pipes to replace). For example, pipes may be ranked with a number from 1 to 5, with "5" representing the highest LOF, and "1" representing the lowest LOF. A single Rank 5 segment, which has a high probability of breaking, can be found surrounded by Rank 1 pipes, which have a low probability of breaking. Most water utilities do not replace single segments, rather they replace entire areas or blocks of pipe. FIGS. 11A and 11B are diagrams illustrating aspects of pipe replacement optimization, according to some embodiments. In FIG. 11A a job planning flow chart is shown in which possible combinations of pipe segments are scanned to obtain jobs having a requisite length. FIG. 11B shows the pipe segments scanned in the chart of FIG. 11A. Note that segment "4" is not chosen in this case since the total length was reached by the three pipe segments shown. FIG. 12 is an illustration of a possible pipe replacement jobs. In order to help utilities with job planning, the current disclosure also provides for the implementation of a job planning procedure. For example, this procedure groups pipes that are connected and finds those with the highest combined Likelihood of Failure per Length ("LOF/Length") as a continuous value. Utilities may also edit their preferred job size in order to create different sized groupings. FIGS. 13A to 13C show three different possible pipe replacement jobs under consideration, according to some embodiments. $1-\Pi(1-P_{si})$ is the probability that one pipe breaks; $\Pi(1-P_{si})=(1-P_{si})(1-P_{si}) \ldots (1-P_{si})$ is the probability that no pipes break; and $P_{si}=1-(1-P_{Li})^{li}$ is the LOF/Segment of $i^{th}$ pipe; $P_{Li}$ is the LOF/Length of the $i^{th}$ pipe segment; and li is the length of the $i^{th}$ pipe segment. In FIG. 13A, the LOF/Construction is 0.87; in FIG. 13B, the LOF/Construction is 0.92; and in FIG. 13C the LOF/Construction is 0.95. In this example, the job of FIG. 13C will be the highest priority job of the three.

This job planning procedure may be implemented as an automated script or in connection with other software. For example, a server may be configured to analyze predicted pipe conditions and automatically provide the customer with a proposed job plan based on the overall conditions of a plurality of pipes. By using this tool, utilities can optimize their job planning process to focus on areas with the highest likelihood of failure.

FIGS. 14A and 14B are diagrams illustrating aspects of predicting missing pipe data values, according to some embodiments. Some utilities have missing information on their pipe network, such as pipe material or installation year. In order to address this, the missing values may be assigned based on surrounding attributes, such as buildings, population, street data, and more. These values may also be assigned based on the utility's own data, if there is enough information available. For example, correlations between public data and utility data may be found, so as to predict the likely values of currently unknown variables. FIG. 14A illustrates extracting correlations between public and utility datasets 1410 and 1412 respectively to build variable prediction model 1420. FIG. 14B shows using variable prediction model 1420 to predict pipe attributes missing in dataset 1430 to create more complete dataset 1432.

Figure 15A:
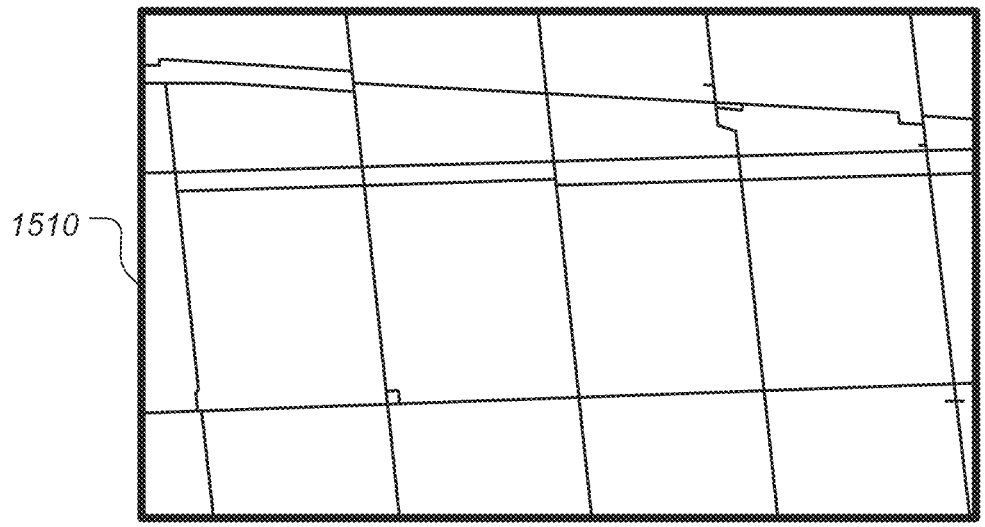
FIGS. 15A and 15B are diagrams illustrating correlations between streets and pipes, according to some embodiments.
Figure 15B:
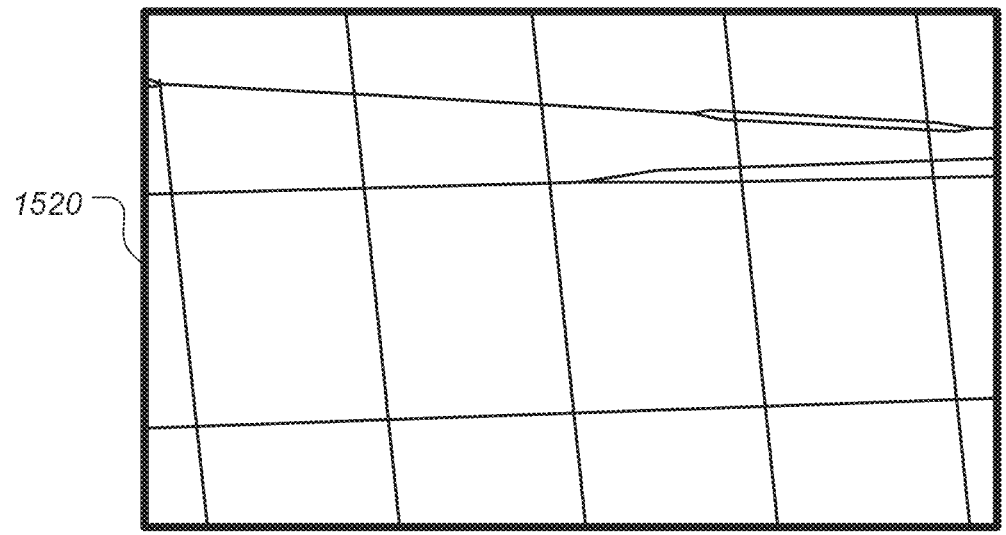
Figure 16:
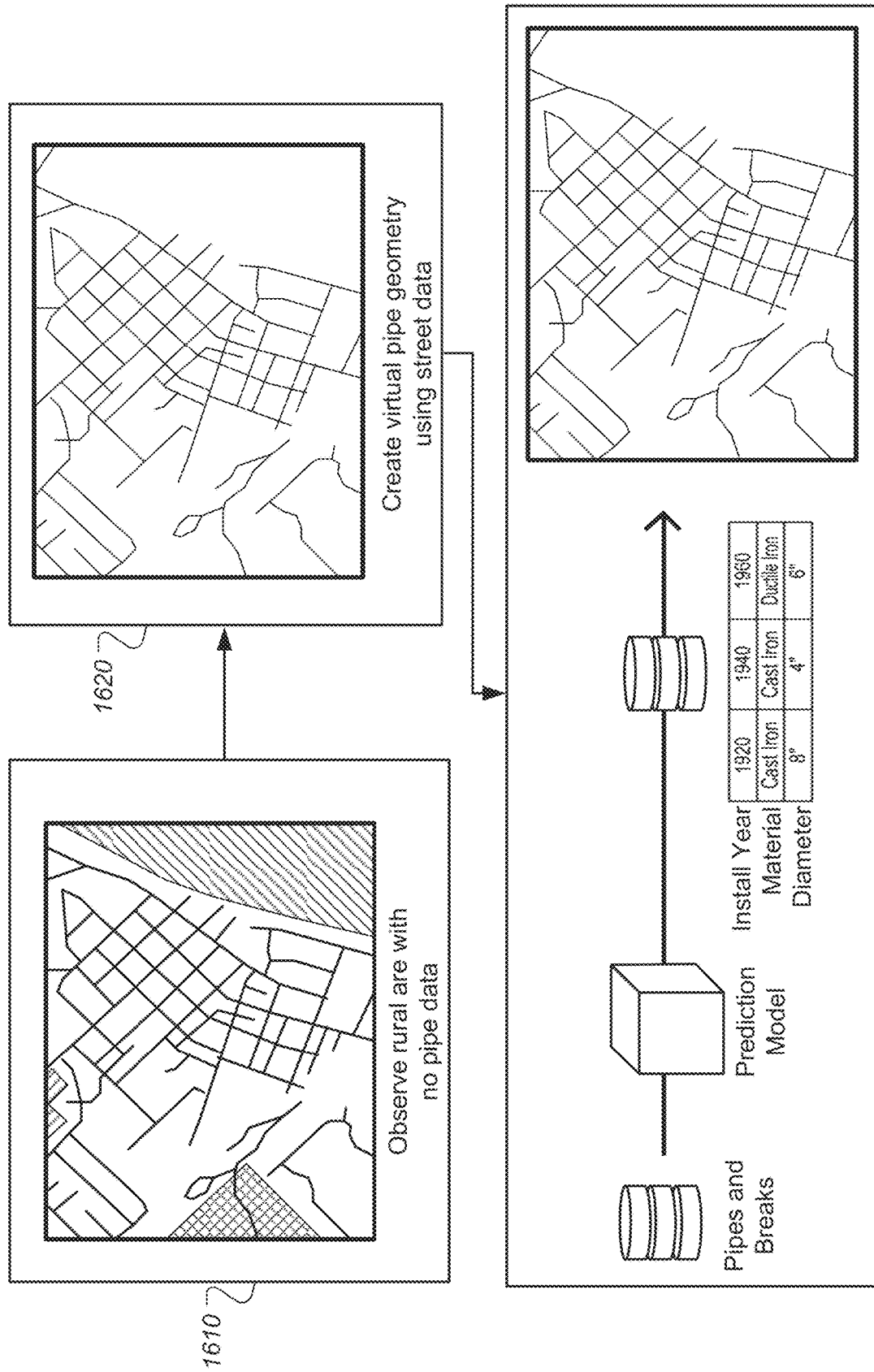
FIG. 16 is a block diagram illustrating the creation of virtual pipe data, according to some embodiments.

FIGS. 15A and 15B are diagrams illustrating correlations between streets and pipes, according to some embodiments. Pipe data 1510 is closely correlated with street data 1520 for the same geographical area. Many smaller utility companies do not have reliable information about their pipes and do not have any geographic information systems ("GIS") data. In order to work with these utilities, the current disclosure provides for the creation of a virtual pipe network. To create the desired geospatial information, a virtual pipe network is built based off of road data. Information on material, diameter, and installation years is filled based off of information provided by the utility, as well as data accrued from working with other utilities. FIG. 16 is a block diagram illustrating the creation of virtual pipe data, according to some embodiments. Block 1610 shows an area that has street data but no pipe data. Block 1620 shows virtual pipe geometry created using the street data. Block 1630 illustrates the use of public data to predict the missing pipe attributes.

The following is an example case of how the disclosed systems and methods may be used by a customer utility company. In this example, ACME Water is a utility company interested in using software that is configured to perform according to some embodiments disclosed herein. First, ACME Water may access a web portal and upload ACME Water's pipe and break data. In this example, ACME Water has many years of break data and relatively thorough pipe data. FIG. 17 is a diagram illustrating cleaning of example pipe data, according to some embodiments. The uploaded raw pipe and break data 1710 can be cleaned, such as by standardizing the data (e.g., standardizing data that appears under a particular data column), and by identifying and correcting any bad data, resulting in cleaned pipe data 1712.

Figure 18:
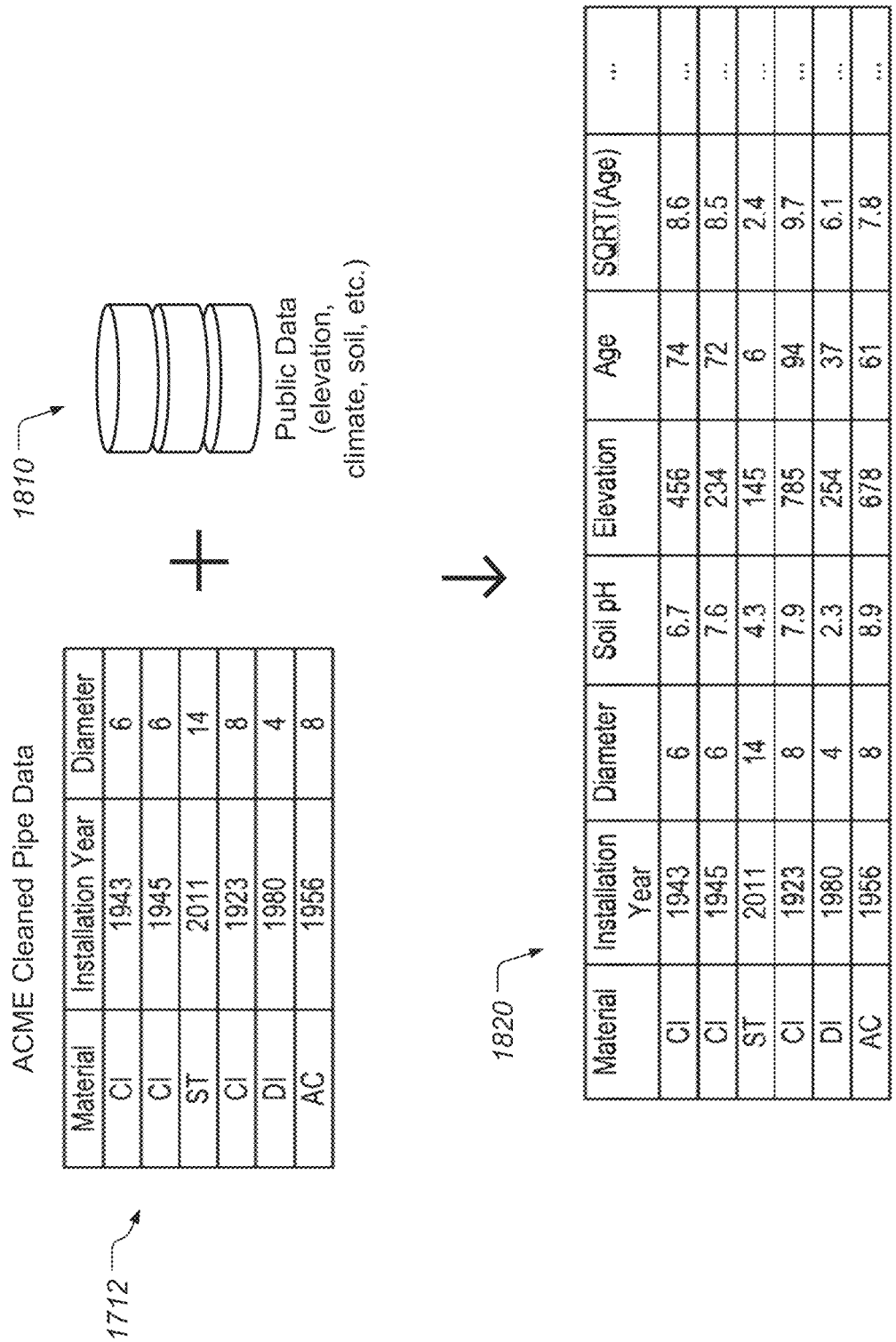
FIG. 18 is a diagram illustrating further processing of example pipe data, according to some embodiments.

FIG. 18 is a diagram illustrating further processing of example pipe data, according to some embodiments. The data 1712 may be prepared for the process of machine learning. For example, public data 1810 (such as Soil pH, elevation, etc.) may be accessed for the region in which ACME Water is located, and the accessed public data 1810 may be merged with the pipe data (as shown in FIGS. 8A, 8B and associated text). In addition, time-based variables (such as age and modifications to age such as the square root) may be added to account for changes in variable properties over time, as described, supra, to yield processed pipe data 1820.

Figure 19:
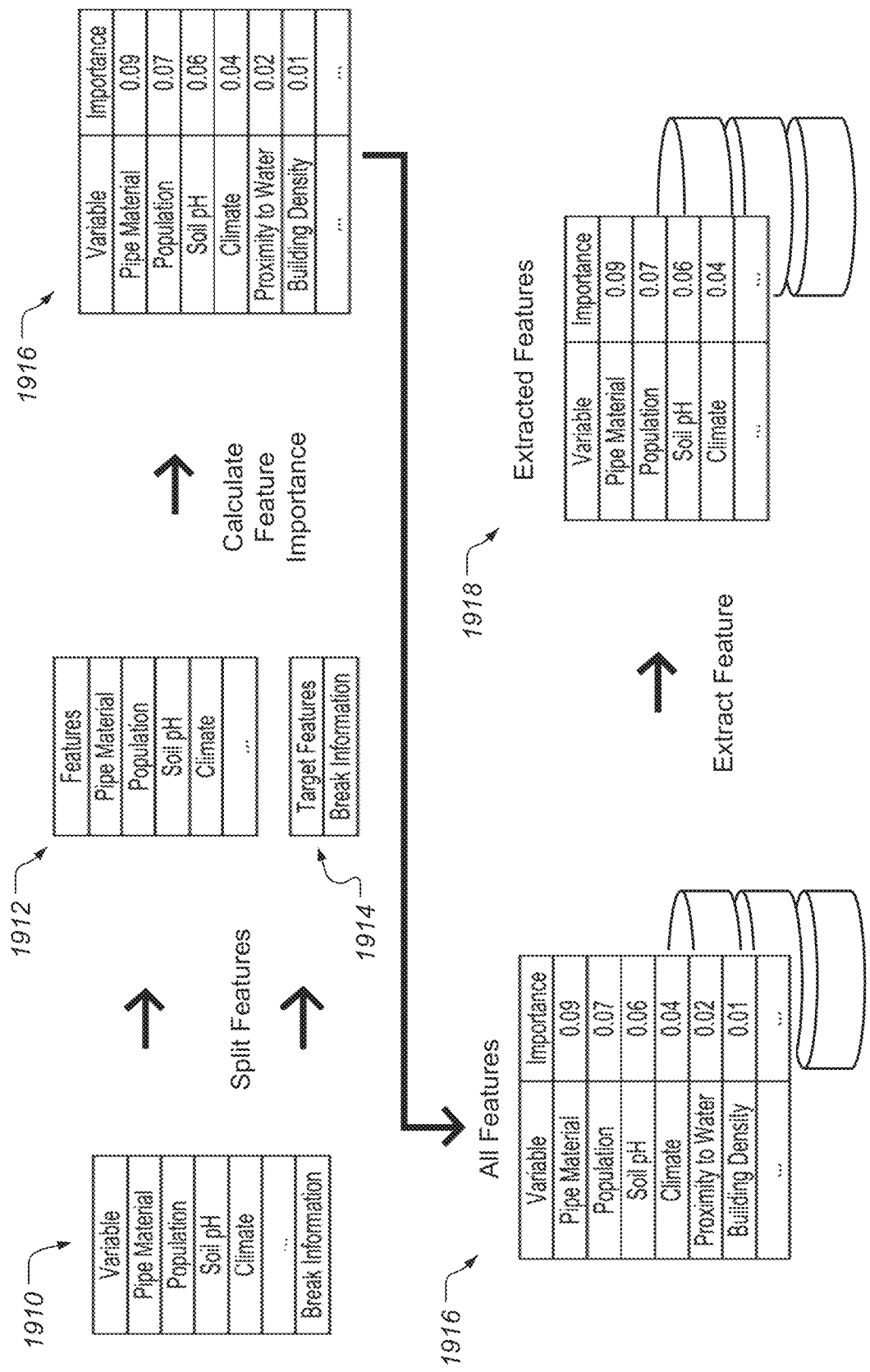
FIG. 19 is a diagram illustrating splitting and extracting features used for machine learning, according to some embodiments.

According to some embodiments, the next step is to run a machine learning process on ACME's cleaned data. FIG. 19 is a diagram illustrating splitting and extracting features used for machine learning, according to some embodiments. The features data 1910 are split into features 1912 and target features 1914, and the features are correlated with the target features in order to calculate the importance of each feature (as shown in FIG. 10 and associated description, supra). The features with calculated importance is shown in FIG. 19 as 1916. Next, important features may be extracted from the dataset as 1918, while features with a lower importance may be dropped.

Figure 20:
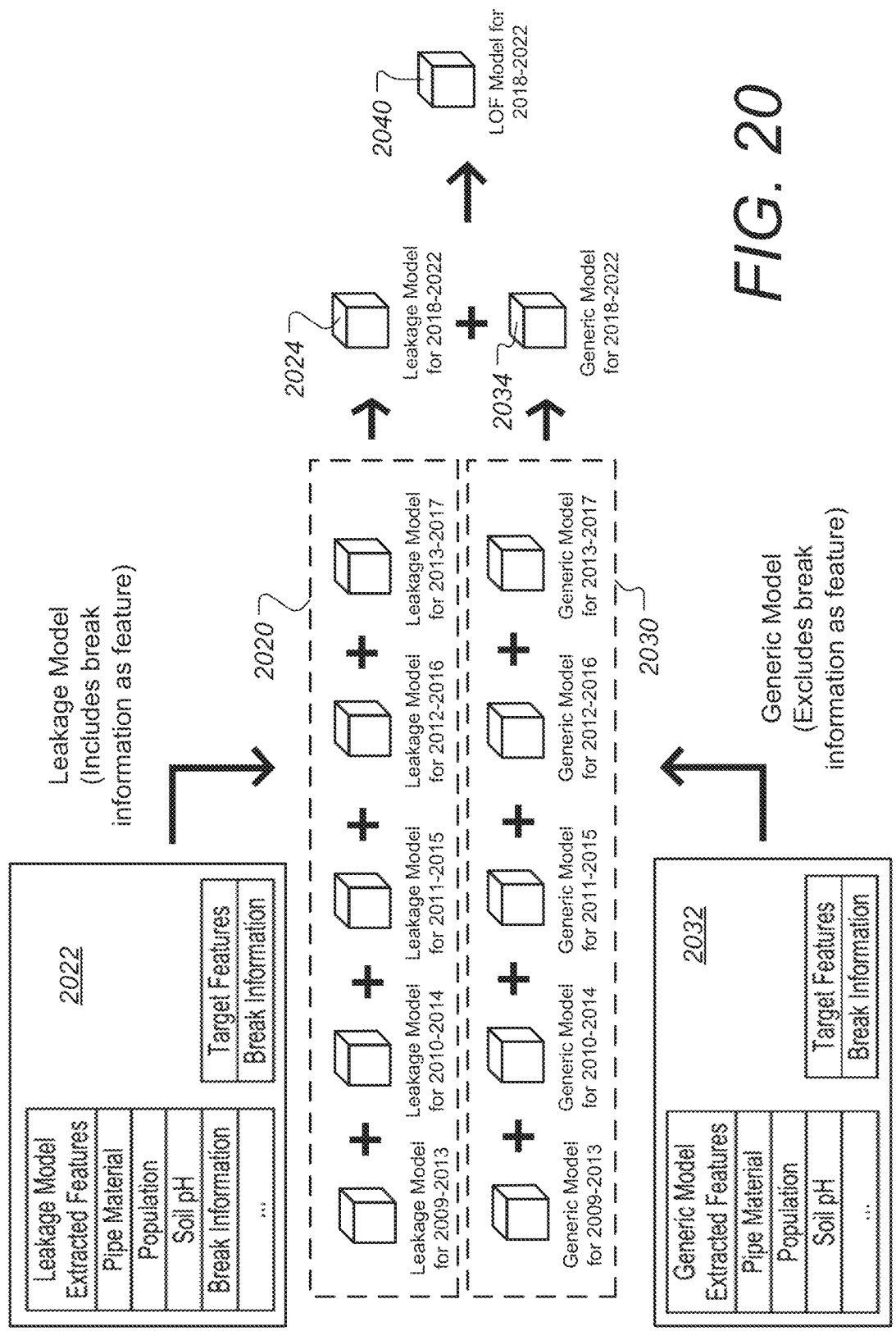
FIG. 20 is a diagram illustrating the creation an LOF model through a combination of leakage and generic models, according to some embodiments.

In order to account for time-varying correlations, several models may be built for the data (as shown in FIG. 6 and described in associated text, supra). FIG. is a diagram illustrating the creation an LOF model through a combination of leakage and generic models, according to some embodiments. In order to build a model to predict the years 2018-2022, models based on past known data are built, while models predicting the years 2009 to 2017 (using data from 2004 to 2017) are built. For every "slice" of years, two models may be built: a generic model and a leakage model (as shown in FIGS. 3A-3C and described in associated text, supra). In FIG. 20 the leakage models 2020 are built using leakage model data 2022 and the generic models 2030 are build using generic model data 2032. The generic model data 2032 may include all features as inputs except for breaks. The leakage model data 2022 includes breaks as well as all other features. Using the averages of the models built, two predictive models for 2018-2022 may be built: a generic model 2024 and leakage model 2034. These models may be combined to create the final mixed model LOF/Length (as a continuous value) result 2040.

Figure 21:
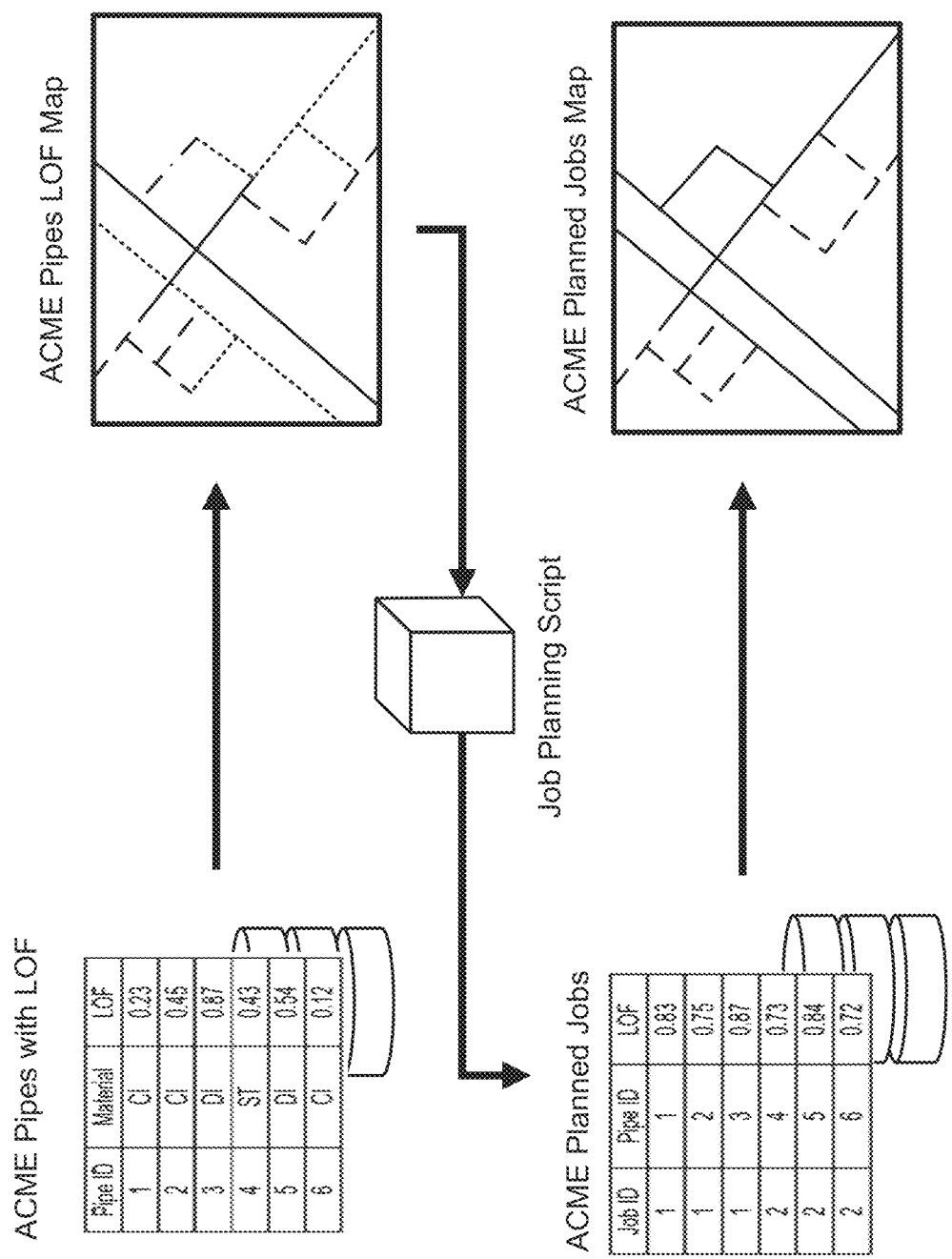
FIG. 21 is a diagram illustrating aspects of job planning, according to some embodiments.

The LOF/Length model 2040 created from the generic and leakage models may assign all pipes with LOF/Length ratings. According to some embodiments, these results can be ranked, and customer (ACME Water) may view the LOF/Length results of its network on the web interface. According to some embodiments, the customer interface may allow for the filtering and sorting of pipes based on the LOF results or based on other assigned variables. With these LOF/Length predictions (as a continuous value), a pipe replacement plan may be created for ACME Water. FIG. 21 is a diagram illustrating aspects of job planning, according to some embodiments. A server implementing job planner software may create several job plans based on the highest LOF/Length within an area. As described supra, this job planner may join pipes with the highest grouped LOF/Length.

Figure 22:
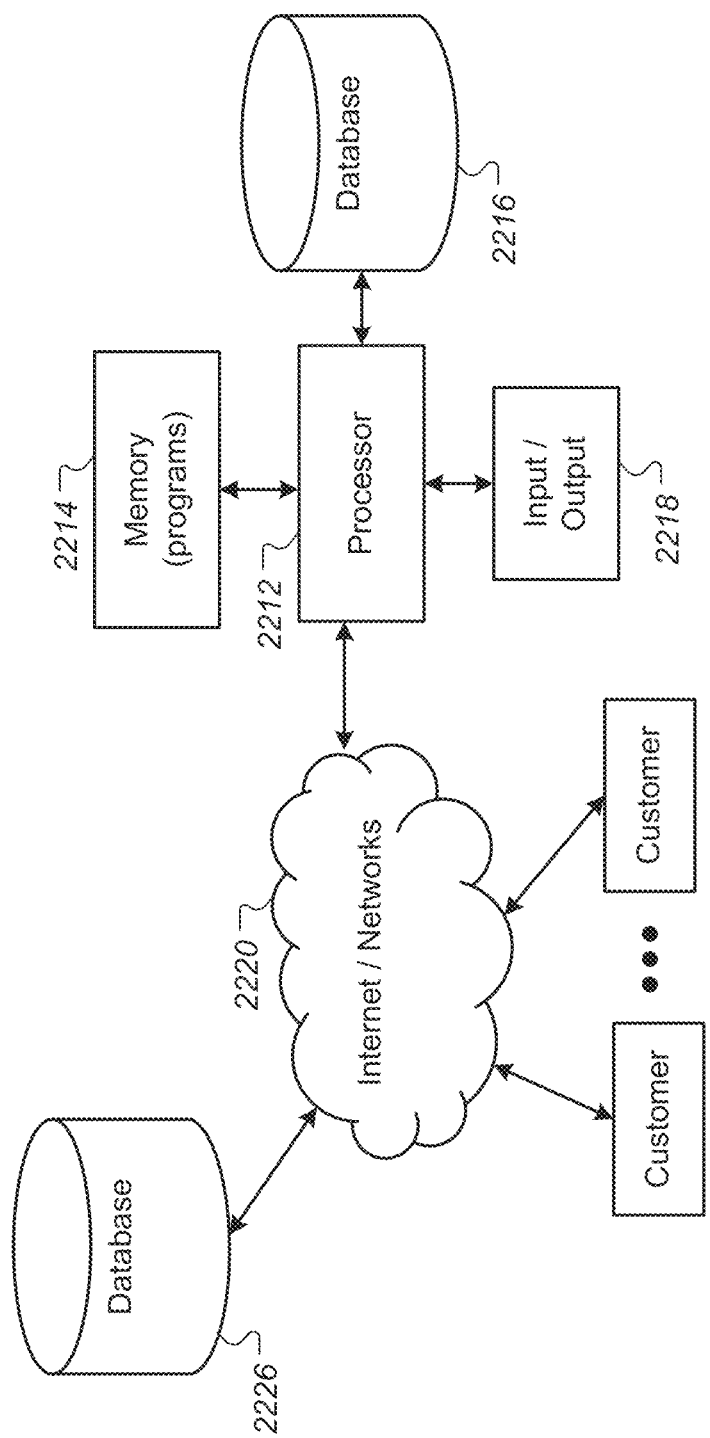
FIG. 22 is a diagram illustrating a system for predicting pipe failures, according to some embodiments.

FIG. 22 is a diagram illustrating a system for predicting pipe failures, according to some embodiments. A server may include a processor 2212 coupled to a memory 2214, a database 2216, input/output devices 2218 and one or more networks 2220. In addition, the methods described herein may be performed in connection with system embodiment shown above.

The memory 2214 may store program instructions for different programs run by various servers described in this application, including the front end web interface server and the back end servers shown and described with respect to FIG. 4, that are used to implement the systems, interfaces, methods and computer implemented processes described herein. The processor 2212 executes the program instructions to cause the processor, platform, server, computer or other device to interact with the other elements coupled to the processor directly or indirectly via networks or buses.

The processor 2212 may be coupled directly or via the Internet, local area networks, wide area networks, wireless networks or any other networks to various databases, customer devices, administrator devices and other devices. The databases 2216 and 2226 may be third party databases that include pipe, public or private information, as described herein, which has a bearing on the likelihood of failure of one or more pipes or pipe sections. The databases 2216 and 2226 may be maintained by third parties or by the same entity that practices the systems and methods described herein.

One or more customers or subscribers may be coupled to the system shown in FIG. 22 via the networks. For example the users may be coupled to the processor 2212 and the front and back end systems described herein via wireless networks such as a 3G, 4G or 5G wireless network, via a Wi-Fi network or via any other network connection. Customer or subscriber information may be stored in a database (such as database 2216 and/or 2226) by the system and each customer may, for example, be provided access to information about a network of pipes that is specific to that customer, which may be a local or regional water utility. There may be multiple customer or water utilities that use the same platform and interface with the platform through a web interface, which provides each customer access to data and allows customers to create projects specific to their pipe network. Alternatively, each customer may have an application that interacts with the system to exchange data regarding the customer's network of pipe and projects. The machine learning aspects of the system may leverage pipe and pipe breakage data across all pipe networks in the system, in order to facilitate more accurate likelihood of failure predictions over time.

According to some embodiments, a prediction is made of LOF/seg, LOF/len, and also a number of breaks in next N years. Note that if the predicted LOF/seg (also referred to here simply as "LOF" herein) for next N years is correct, the calculation of predicted number of breaks is straight forward. The sum of LOF should correspond to predicted number of breaks in next N years, assuming that none of the pipes have multiple breaks in next N years.

However, LOF usually contains some amount of error, which comes from over-confidence or under-confidence of the prediction model. This can lead to the predicted number of breaks in N years, which is calculated by the sum of LOF, to deviate from expected results. For example, in case the number of breaks in the most recent 5 years is about 120, the predicted number of breaks can be 180 (>>120). While this may be true, it is somewhat likely that this is an unreasonably high number since it represents such a large increase. Moreover, this can happen even if the order of sorted LOF is very good ("order of sorted LOF is good" means "prioritizations of good pipes and bad pipes are good". Prioritization is important because it is highly relied-upon when planning pipe replacement.) It has been found that the above issue is caused by an inaccuracy of LOF's scale.

Figures 23, 24:
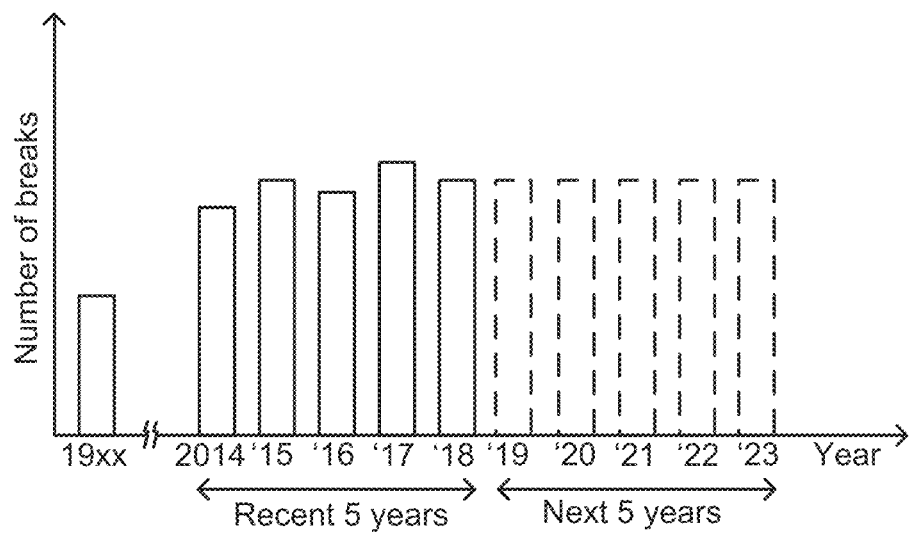
FIG. 23 is a diagram illustrating predicting the number of breaks from LOF, according to some embodiments.
FIG. 24 is a diagram illustrating the expected similarity in break for the past five years and the next five years.

FIG. 23 is a diagram illustrating predicting the number of breaks from LOF, according to some embodiments. Predicted number of breaks in N years could be the sum of LOF for next N year as shown in FIG. 23. There is usually a gap between predicted number of breaks and the expected result. It may be assumed that there is no big difference between breaks in the most recent N years and the breaks in the next N years, provided that N years is short term or middle term.

Figure 25:
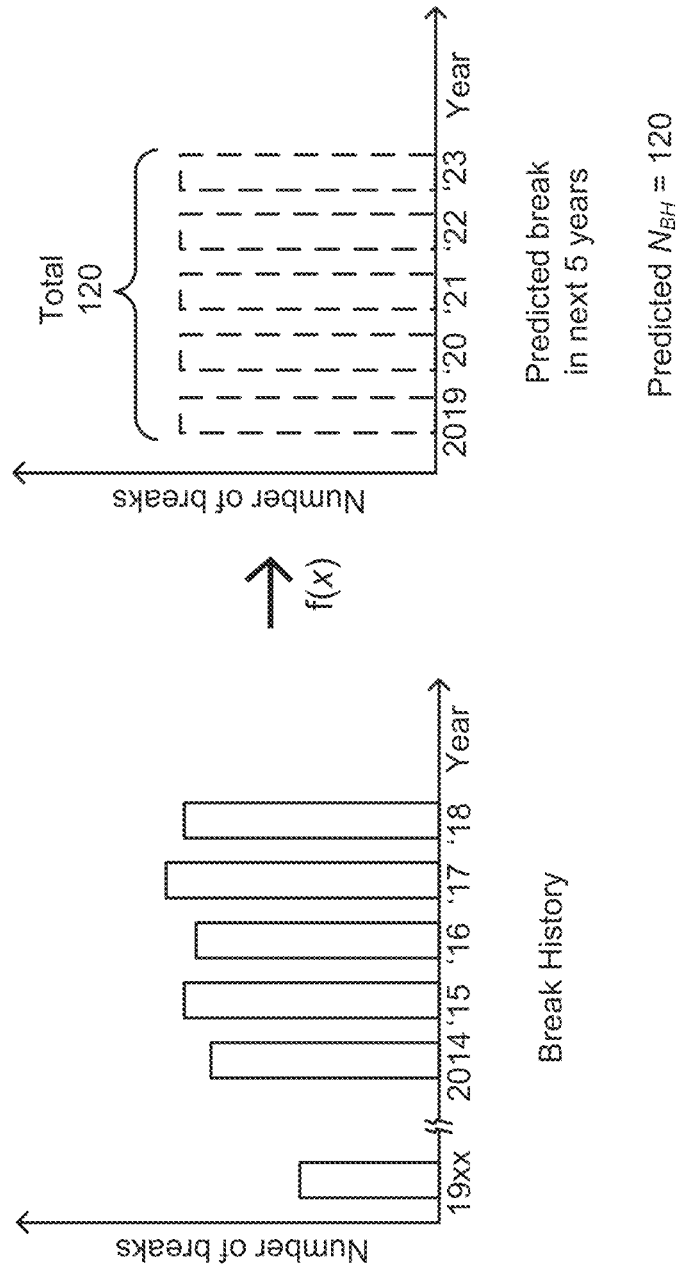
FIG. 25 is a diagram illustrating that the predicted number of breaks next N years can be calculated based on break history, according to some embodiments.

FIG. 24 is a diagram illustrating the expected similarity in break for the past five years and the next five years. The number of breaks in the past 5 years and the predicted breaks in the next 5 years should be similar as shown. FIG. 25 is a diagram illustrating that the predicted number of breaks next N years can be calculated based on break history, according to some embodiments. In this case the predicted breaks in the next 5 years, $N_{BH}$, is 120 total.

Figure 26:
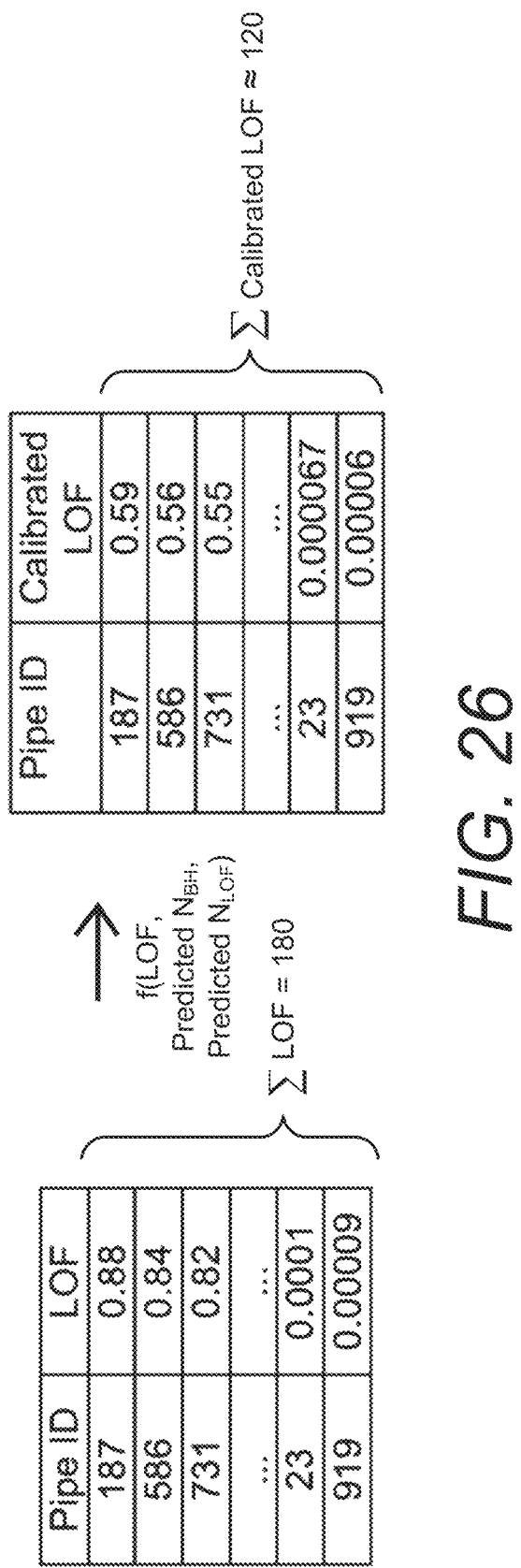
FIG. 26 is a diagram illustrating LOF probability calibration, according to some embodiments.

FIG. 26 is a diagram illustrating LOF probability calibration, according to some embodiments. LOF may be calibrated with LOF, predicted number of breaks from break history (Predicted $N_{BH}$), and predicted number of breaks from LOF (Predicted $N_{LOF}$). According to some embodiments, the LOF of leakers and non-leakers may be respectively calibrated with the same way. According to some embodiments, LOF may be used to calculate BRE (Business Risk Exposure) which is estimated amount of damage when a pipe is broken. BRE is the product of LOF and COF (Consequence of Failure). LOF should be well-calibrated because BRE will be overestimated even if COF is perfectly correct.

According to some embodiments, the following algorithm can be used for the calibration:
i) Calculate the predicted number of breaks based on an utility's break history.
  (1) Remove outliers from the break history by following the process:
    (a) It may not be assumed that number of breaks of the latest year ($Nb_n$) has all breaks of the year when $Nb_n$ satisfies the following equation:

$Nb_n < c_1 Nb_{n-1}$ n: the latest year
    $0 < c_1 < 1.0$
    (b) Use Interquartile Range Method to remove outliers. Numbers may be removed when the numbers are out of range:

$[q_I - c_2(IQR), q_J + c_2(IQR)]$ $q_I$: Ith quartile, $q_J$: Jth quartile, I<<J $IQR = q_J - q_I$, $1.0 \leq c_2 \leq 1.5$ (c) Remove numbers when they are smaller than $c_3 \times M$.
      M: mean, median, max or min of number of breaks in recent N years
      $0 < c_3 < 1$
  (2) Use the remaining numbers to gain the predicted number of breaks from break history by using mean, weighted mean, linear regression, exp, log or machine learning.
ii) Calibrate LOF/seg from itself and the ratio between predicted number of breaks from break history and LOF. calibrated LOF/seg=LOF/seg×x $$x = \frac{\text{Predicted } N_{BH}}{\text{Predicted } N_{LOF}}$$

Predicted $N_{BH}$: predicted number of breaks from break history
Predicted $N_{LOF}$: predicted number of breaks from LOF
If calibrated LOF/seg≥1.0, calibrated LOF/seg is set to 1−c, where c is >0 and very close to 0 (so e.g. LOF/seg will be 0.99999 . . . ).
iii) Calibrate LOF/len:

calibrated LOF/len=1−(1−calibrated LOF/seg)$^{1/L}$

L: length of pipe

As described, supra, the machine learning models described thus far can use over one thousand variables to calculate the importance of each variable based on techniques such as Gini coefficient or Information gain. According to some embodiments, the variables may be grouped into categories such as the following fourteen: Soil Property, Terrain, Climate, Population, Building, Transportation, Water Area, Zoning, Shoreline, Age, Break History, Diameter, Material and Pressure. Examples of "Soil Property" include: pH, CaCO3, Bulk Density and Water Content etc. The model may use a certain number of variables from the same category to calculate LOF.

Figure 27:
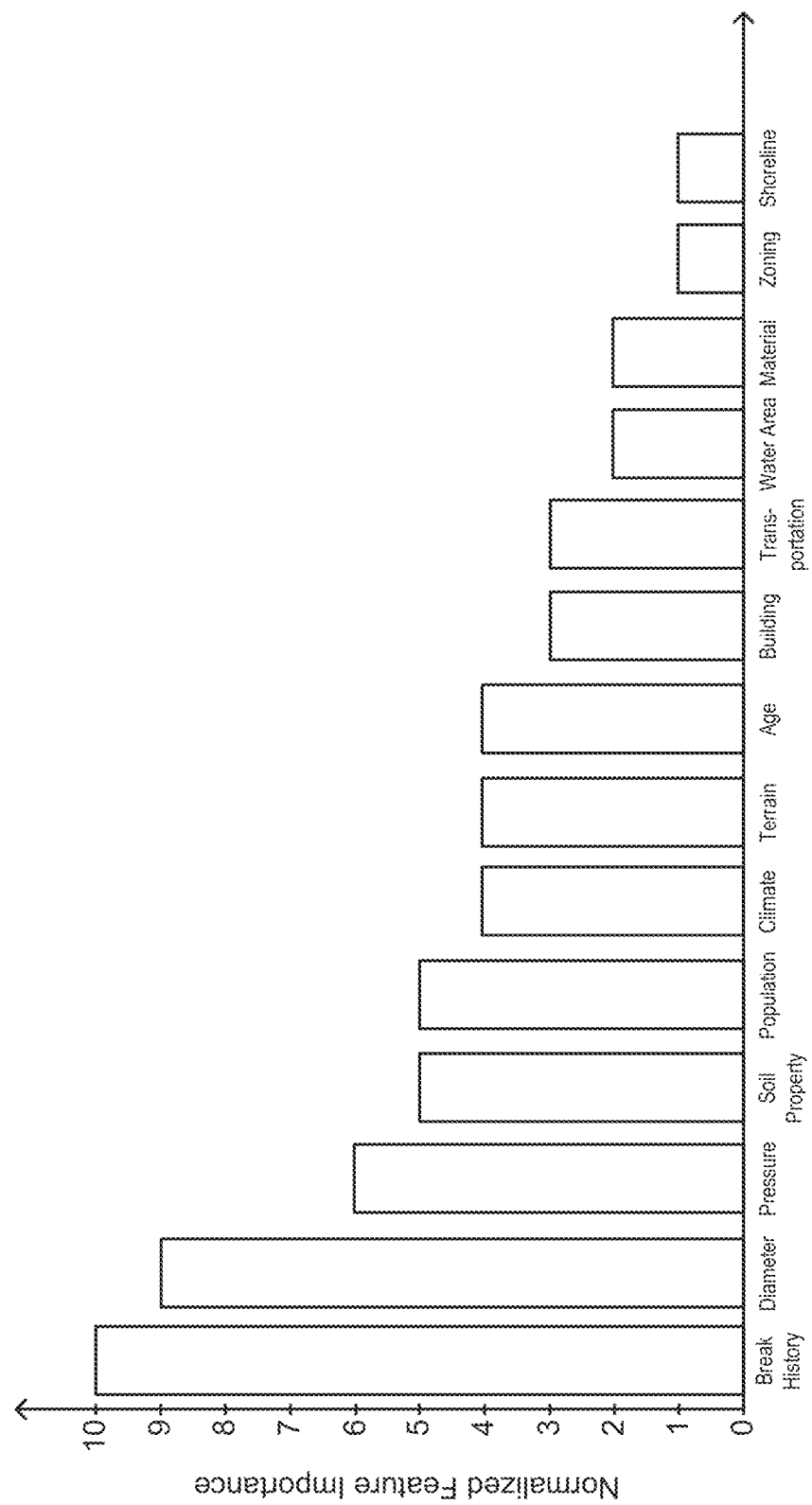
FIG. 27 is a plot showing an example ranking of variable categories, according to some embodiments.

The model can be considered a "black box" when the feature importances are not shown. Utility companies may wish to understand which attributes affect to pipe deterioration because they may use knowledge to maintain and manage their pipes. The categories may be ranked from 1 to 10 depending on importance, or they can be sorted by importance and assigned to according to the sorted order. "10" represents the most important feature. "1" represents the lowest. FIG. 27 is a plot showing an example ranking of variable categories, according to some embodiments.

According to some embodiments, feature importances may be automatically calculated and categorized by following the technique shown in FIG. 10 and described in associated text, supra.

Figure 28:
FIG. 28 is a diagram illustrating an example of calculating representative feature importance of soil, according to some embodiments.

FIG. 28 is a diagram illustrating an example of calculating representative feature importance of soil, according to some embodiments. Representative importance of each category may be max, mean, weighted mean or median of the importances in each category.

Figure 29:
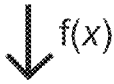
FIG. 29 is a diagram illustrating normalization of representative feature importance of the categories.

FIG. 29 is a diagram illustrating normalization of representative feature importance of the categories. The representative importance for each of the categories (e.g. 14 categories listed, supra) can be normalized, for example, using the following:

$$X_{normalized} = \frac{X - X_{min}}{X_{max} - X_{min}}$$

-continued $$X_{normalized} = \frac{X - \mu}{\sigma}$$

$$X = [x_{soil}, x_{terrain}, \ldots]$$

$x_{category}$: representative importance of each category

FIG. 30 is a diagram illustrating ranking a number of representative features by importance from 1 to 10. In the example discussed, there are 14 representative feature categories. The representative importances of each is then ranked based on its normalized value on a 1 to 10 scale. According to some embodiments, after normalizing the importance, the normalized importance evenly split into 10 levels. In one examples, if maximum normalized importance is 0.8 and minimum normalized importance is 0.0, then the 1 to 10 values can be assigned as follows for the following normalized importance ranges: "10" for 0.72 to 0.8; "9" for 0.64 to 0.72; "8" for 0.56 to 0.64; "7" for 0.48 to 0.56; "6" for 0.40 to 0.48; . . . ; "2" for 0.8 to 0.16; and "1" for 0.0 to 0.8. Using an even split technique such as this, however, some assigned importance values can be skipped. To avoid this, an assignment based on sorted value, as described supra, can be used.

According to some embodiments, the range of prediction years provided by the model is dependent on the available break history of the utility. For example, the machine learning model can provide a five year LOF if the utility has sufficiently long break history. However, the available break history is not sufficient the model can provide only a three year LOF. Even though some utilities do not have a long enough break history to predict five years, most of the utilities want to know a five year LOF. Moreover, many utilities want a short term LOF such as 1 year LOF to optimize the current operation, while they plan to use a middle term LOF such as 3 year and 5 year LOF to plan replacements. In order to help utilities with current operation, an N year LOF can be approximately calculated from an M year LOF when assuming that the break behavior does not change.

For example, 5 year LOF may be predicted from data of a utility and be used to approximately calculate 1 year and 3 year LOF, using the following method. First, an M year LOF (P) is predicted. Next, the probability that a pipe does not break in M years is 1−P. The probability that a pipe does not break in N years is $$(1-P)^{\frac{N}{M}}.$$

Then, an N year LOF is $$1-(1-P)^{\frac{N}{M}}.$$

Following is an example:

5 year LOF=$P$ (predicted from utility data)

1 year LOF=$1-(1-P)^{1/5}$ 3 year LOF=$1-(1-P)^{3/5}$

Although the foregoing embodiments have pertained primarily to networks of underground pipes, according to some embodiments many of the techniques described can be applied to other types of networks. According to some embodiments, the systems and methods described herein are applied to networks of electrical wires used to supply electrical power to consumers such as between above ground utility poles and/or underground nodes. According to some further embodiments, utility poles themselves, rather than or in addition to the electrical wires can also be treated as a target asset. In adapting the described techniques to other types of networks and/or assets a different set of environmental variables may be uses. For example in the case of above ground electrical wires, a subset of environmental variables can be used rather than all environmental variables used for underground pipes. In this case, soil may be removed from variable set, if the electric wires are the above ground. The meaning of a failure event should also be re-defined. For example in case of electric wires, a failure may mean tear of wire, deterioration of condition or strength etc. In case of a utility pole, a failure may mean break, deterioration of condition or strength.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the body of work described herein is not to be limited to the details given herein, which may be modified within the scope and equivalents of the appended claims.

What it claimed is:

1. A prioritized pipe replacement method, including for pipes that have never leaked, that incorporates predicting pipe leaks in a network of underground pipes for carrying a fluid consumers, including for pipes that have never leaked, the method comprising:
   receiving by a computer system a first set of variables potentially affecting leakage of the pipes, the first set of variables being at least 60 variables;
   wherein at least some of the variables of the first set include data pertaining to pipes which have never leaked;
   selecting automatically by the computer system a second set of variables being a subset of the first set of variables;
   building a mathematical model using machine learning based on the second set of variables;
   predicting likelihood of pipe segments leaking based on the model, including for pipes that never have leaked; and
   forming a graphical depiction of the pipes and of likelihood of failure thereof over a selected future time period of prioritization of pipe replacement jobs; and
   carrying out pipe replacement, including for pipes that have never leaked, consistent with and guided by said graphical depiction.

2. A method according to claim 1 wherein the selecting includes building an initial model based on the first set of variables and evaluating importance associated with each variable in the first set based said initial model.

3. A method according to claim 2 wherein the evaluating importance is based on evaluating a Gini coefficient or information gain coefficient.

4. A method according to claim 1 wherein at least some of the first set of variables are assigned to predetermined categories and selecting includes selecting no more than predetermined number of variables in each category to be included in the second set.

5. A method according to claim 1 wherein the number of variables in the first is at least 100.

6. A method according to claim 5 wherein the number of variables in the first set is at least 500.

7. A method according to claim 1 wherein the number of variables in the second set is less than 60.

8. A method according to claim 7 wherein the number of variables in the first set is at least 300 and the number of variables in the second set is less than 50.

9. A method according to claim 1 wherein a portion of the first set of variables are generated by geospatial analysis.

10. A method according to claim 1 wherein said network of pipes is for a first customer utility company and said building the model includes using data from a second customer utility company.

11. A method according to claim 1 wherein said building the model includes using data from an integrated national utility database.

12. A method according to claim 1 wherein said building the model is based at least in part on a plurality of models each being based on data from different time intervals.

13. A method according to claim 1 wherein said fluid is fresh water.

14. A method according to claim 1 wherein said fluid is selected from a group consisting of: waste water, recycle water, brackish water, storm water, sea water, drinking water, oil, natural gas, steam and compressed air.

15. A method according to claim 1 wherein said predicting includes predicting likelihood of pipe segments leaking over a future time interval wherein the prediction result is calibrated based in part on a number of breaks known to have occurred over a similar length prior time interval.

16. A method according to claim 1 wherein at least some of the first set of variables are assigned to predetermined categories and the method further comprises evaluating a normalized importance associated with each of the predetermined categories.

17. A method according to claim 1 wherein the predicting of pipes segments leaking is made for a greater number of years in the future than the number of years for which a leak history of pipes in the network is available.

18. A system for prioritized pipe replacement, including of pipes that have never leaked, incorporating predicting pipe leaks including for pipes that have never leaked, in a network of underground pipes for carrying fluid to consumers, the system comprising:

a database that stores a first set of variables relating to leakage of the pipes, the first set of variables being at least 60 variables;

wherein at least some of the variables of the first set include data pertaining to pipes which have never leaked;

and a processing system configured to automatically:

select a second set of variables being a subset of the first set of variables;

build a model using machine learning based on the second set of variables;

predict likelihood of pipes segments leaking based on the model;

form a graphical depiction of the pipes in said network and of likelihood of failure thereof over a selected future time period and of prioritization of pipe replacement jobs; and display said graphical depiction of pipes in said network and of likelihood of failure thereof over the selected future time and prioritization of pipe replacement jobs for carrying out pipe replacement, and prioritize the replacement of pipes, including of pipes that have never leaked, consistent with and guided by said graphical depiction.

19. A system according to claim 18 wherein the processing system selects the second set by building an initial model based on the first set of variables and evaluating importance associated with each variable in the first set based said initial model.

20. A system according to claim 18 wherein at least some of the first set of variables are assigned to predetermined categories and no more than predetermined number of variables in each category are selected to be included in the second set.

21. A system according to claim 18 wherein the number of variables in the first set is at least 500.

22. A system according to claim 18 wherein the number of variables in the second set is less than 50.

23. A system according to claim 18 wherein said fluid is selected from a group consisting of: fresh water, waste water, sea water, recycled water, brackish water, storm water, drinking water, steam, compressed air, oil and natural gas.

* * * * *